United States Patent
Hsu et al.

(10) Patent No.: US 11,645,047 B2
(45) Date of Patent: May 9, 2023

(54) FOCUSED SPECIFICATION GENERATION FOR INTERACTIVE DESIGNS

(71) Applicant: Axure Software Solutions, Inc., San Diego, CA (US)

(72) Inventors: Victor Hsu, San Diego, CA (US); Martin Smith, San Diego, CA (US); Robert Gourley, San Diego, CA (US)

(73) Assignee: Axure Software Solutions, Inc., San Diego, CA (US)

( * ) Notice: Subject to any disclaimer, the term of this patent is extended or adjusted under 35 U.S.C. 154(b) by 447 days.

(21) Appl. No.: 16/569,963

(22) Filed: Sep. 13, 2019

(65) Prior Publication Data

US 2021/0081180 A1     Mar. 18, 2021

(51) Int. Cl.
    *G06F 8/34*     (2018.01)
    *G06F 8/36*     (2018.01)
    *G06F 8/10*     (2018.01)

(52) U.S. Cl.
    CPC .............. *G06F 8/34* (2013.01); *G06F 8/10* (2013.01); *G06F 8/36* (2013.01)

(58) Field of Classification Search
    CPC .............. G06F 8/10; G06F 8/34; G06F 8/36
    See application file for complete search history.

(56) References Cited

U.S. PATENT DOCUMENTS

| | | |
|---|---|---|
| 5,900,870 A | 5/1999 | Malone et al. |
| 6,199,193 B1 | 3/2001 | Oyagi et al. |
| 6,750,858 B1 | 6/2004 | Rosenstein |
| 7,225,424 B2 | 5/2007 | Cherdron et al. |

(Continued)

FOREIGN PATENT DOCUMENTS

| | | |
|---|---|---|
| AU | 2008261147 A1 | 7/2010 |
| AU | 2009202142 A1 | 12/2010 |
| KR | 20130040057 A | 4/2013 |

OTHER PUBLICATIONS

Padmavathi Mundur et al., "Keyframe-based video summarization using Delaunay clustering," 2006 [retrieved on Nov. 6, 2021], International Journal on Digital Libraries (2006), pp. 219-232, downloaded from <url>:https://link.springer.com/content/pdf/10.1007/s00799-005-0129-9.pdf. (Year: 2006).*

(Continued)

*Primary Examiner* — S. Sough
*Assistant Examiner* — Stephen D Berman
(74) *Attorney, Agent, or Firm* — MLO, a professional corp.

(57) ABSTRACT

A focused specification for an interactive graphical design is generated by receiving a first user input from a user, the first user input identifying a first design element of the interactive graphical design. A set of selectable data elements associated with the first design element is identified and a specification template that includes the set of selectable data elements is generated. A second user input is received from the user, the second user input identifying a set of selected data elements using the generated specification template. The set of selected data elements includes one or more of the selectable data elements. The focused specification is generated using the set of selected data elements, the focused specification including the set of selected data elements and excluding selectable data elements that were not selected.

27 Claims, 14 Drawing Sheets

(56) References Cited

U.S. PATENT DOCUMENTS

| | | |
|---|---|---|
| 7,251,778 B1 | 7/2007 | Hill et al. |
| 7,475,346 B1 | 1/2009 | Bullock et al. |
| 7,890,853 B2 | 2/2011 | Neil et al. |
| 7,954,068 B2 | 5/2011 | Riggs et al. |
| 8,166,402 B2 | 4/2012 | Collins et al. |
| 8,671,352 B1 | 3/2014 | Hsu et al. |
| 8,938,679 B1 | 1/2015 | Hsu et al. |
| 9,773,264 B2 | 9/2017 | Brown et al. |
| 9,792,270 B2 | 10/2017 | Kloiber et al. |
| 10,275,265 B1* | 4/2019 | Gould ................ G06F 3/04842 |
| 10,685,155 B2 | 6/2020 | Wang |
| 2003/0009567 A1 | 1/2003 | Farouk |
| 2003/0020671 A1 | 1/2003 | Santoro et al. |
| 2003/0101203 A1 | 5/2003 | Chen et al. |
| 2003/0222912 A1 | 12/2003 | Fairweather |
| 2004/0001106 A1 | 1/2004 | Deutscher et al. |
| 2005/0102360 A1 | 5/2005 | Chavis et al. |
| 2005/0216882 A1* | 9/2005 | Sundararajan ............ G06F 8/10 |
| | | 717/104 |
| 2005/0246627 A1 | 11/2005 | Sayed |
| 2006/0005207 A1 | 1/2006 | Louch et al. |
| 2006/0036955 A1 | 2/2006 | Baudisch et al. |
| 2006/0236264 A1 | 10/2006 | Cain et al. |
| 2006/0242121 A1 | 10/2006 | DeVorchik et al. |
| 2006/0259875 A1 | 11/2006 | Collins et al. |
| 2007/0192682 A1 | 8/2007 | Neil et al. |
| 2008/0155457 A1 | 6/2008 | Ittel |
| 2009/0144652 A1 | 6/2009 | Wiley |
| 2009/0178008 A1 | 7/2009 | Herz et al. |
| 2009/0271742 A1 | 10/2009 | Zhang et al. |
| 2010/0138778 A1 | 6/2010 | Dewan et al. |
| 2010/0153865 A1 | 6/2010 | Barnes et al. |
| 2010/0223593 A1 | 9/2010 | Eldridge et al. |
| 2011/0004820 A1 | 1/2011 | Kloiber et al. |
| 2012/0233137 A1 | 9/2012 | Jakobson et al. |
| 2012/0324428 A1 | 12/2012 | Ryan et al. |
| 2013/0004087 A1 | 1/2013 | Kumar et al. |
| 2013/0167080 A1 | 6/2013 | Ari et al. |
| 2014/0082032 A1 | 3/2014 | Leblond et al. |
| 2014/0258841 A1 | 9/2014 | Strong |
| 2014/0282365 A1 | 9/2014 | Hsu et al. |
| 2014/0337706 A1 | 11/2014 | Hsu et al. |
| 2014/0337768 A1* | 11/2014 | Hsu ..................... G06F 40/197 |
| | | 715/760 |
| 2015/0143270 A1* | 5/2015 | Hsu ..................... G06F 3/0486 |
| | | 715/763 |
| 2015/0169517 A1* | 6/2015 | Hsu ..................... G06F 16/958 |
| | | 715/234 |
| 2016/0034144 A1* | 2/2016 | Hsu ................... G06F 3/04845 |
| | | 715/763 |
| 2016/0070813 A1 | 3/2016 | Ecker et al. |
| 2016/0103797 A1 | 4/2016 | Greenberg et al. |
| 2016/0357373 A1 | 12/2016 | Greenberg et al. |
| 2017/0083296 A1 | 3/2017 | Rempell et al. |
| 2017/0293596 A1 | 10/2017 | Hsu et al. |
| 2018/0181378 A1 | 6/2018 | Bakman |
| 2018/0259927 A1 | 9/2018 | Przybylski et al. |
| 2019/0028531 A1 | 1/2019 | Nagar et al. |
| 2019/0121617 A1* | 4/2019 | Shack ....................... G06F 8/10 |
| 2019/0310844 A1* | 10/2019 | Mills ...................... G06F 8/316 |
| 2020/0089396 A1* | 3/2020 | Shrivastava ............. G06F 8/24 |
| 2020/0097129 A1 | 3/2020 | Dykan et al. |
| 2020/0133642 A1* | 4/2020 | Payne ....................... G06F 8/38 |

OTHER PUBLICATIONS

Notice of Allowance dated Apr. 29, 2020 for U.S. Appl. No. 15/634,787.

Notice of Allowance dated Mar. 24, 2021 for U.S. Appl. No. 16/779,311.

BugHerd Features, Bug tracking system and visual feedback tool/ BugHerd Features, Accessed Online on May 22, 2019, https:// bugherd.com/features.

BugHerd Referral, The simplest bug tracker and issue tracker/ BugHerd, Accessed Online: May 22, 2019, https://bugherd.com/? utm_referral_capterra=capterra.

Slack Screenshot Tool: Use Marker & Slack as a powerful Bug Tracker, Accessed Online: May 22, 2019, https://marker.io/slack.

UserSnap Classic, Visual Feedback Solution for Websites/Usersnap, Accessed May 22, 2019, https://usersnap.com/classic.

UserSnap Use Cases Digital Agency, Client Feedback and Web Agencies/Usersnap Use Case, Accessed Online: May 22, 2019, https://usersnap.com/use-cases/digital-agency.

UserSnap Use Cases Software Company, Understand Your Customers/ Usersnap Use Case, Accessed Online: May 22, 2019, https://usersnap. com/use-cases/software-company.

International Search Report dated Nov. 8, 2019 for PCT Patent Application No. PCT/US19/43848.

Advisory Action dated Oct. 10, 2019 for U.S. Appl. No. 15/634,787.

Notice of Allowance dated Nov. 14, 2019 for U.S. Appl. No. 16/106,547.

Office Action dated Jan. 15, 2020 for U.S. Appl. No. 15/634,787.

Anonymous: "Creating a mobile-friendly web page with Dreamweaver CS5.5—Tutorial—Dreamweaver Club", Jan. 17, 2013 (Jan. 17, 2013), P055812201, Retrieved from the Internet: URL:https://web. archive.org/web/20130117161029/http://www.dreamweaverclub. com/mobile— friendly.php.

Office Action dated Jun. 15, 2021 for European Patent Office Patent Application No. 14794970.5.

Office Action dated Dec. 13, 2021 for U.S. Appl. No. 16/949,406.

Office Action dated Dec. 22, 2021 for U.S. Appl. No. 17/012,750.

Office Action dated Aug. 27, 2021 for U.S. Appl. No. 17/012,750.

Notice of Allowance and Fees dated Apr. 5, 2022 for U.S. Appl. No. 17/012,750.

Office Action dated Apr. 29, 2022 for U.S. Appl. No. 17/305,767.

European Search Report dated Mar. 31, 2022 for European Patent Office Patent Application No. 19852896.0.

Notice of Allowance and Fees dated Sep. 14, 2022 for U.S. Appl. No. 17/305,767.

Office Action dated Jun. 29, 2022 for U.S. Appl. No. 16/949,406.

Office Action dated Oct. 5, 2022 for U.S. Appl. No. 16/949,406.

* cited by examiner

FOCUSED SPECIFICATION GENERATION FOR INTERACTIVE DESIGNS

RELATED APPLICATIONS

This application relates to U.S. Pat. No. 8,671,352, filed Sep. 12, 2013, U.S. Pat. No. 9,389,759, filed May 7, 2013, and U.S. Pat. No. 8,938,679, filed Mar. 7, 2014, all of which are incorporated by reference herein in their entirety.

BACKGROUND OF THE INVENTION

Interactive design prototyping software applications are used to create interactive designs representing desired changes to production software applications that are used within web browsers, computer desktop applications, mobile devices, vehicles, stand-alone terminals such as point of sale systems and kiosks, among other uses. Interactive designs typically include design elements such as images, rendered graphics, videos, and animations, as well as interactive design elements which can receive user input from a touch screen, a mouse, a physical dial, a physical button, and so on. Interactive designs and their associated design elements correspond to respective data elements such as assets, content, and corresponding metadata that can include one or more sets of compiled instructions (e.g., JAVA), scripted instructions (JAVASCRIPT, PYTHON, PHP), mark-up and layout instructions (HTML, CSS, XML), redline markups, layout measurements, or other metadata (e.g., JSON, SQL, data objects, etc.). Design elements which respond to received user input include graphical buttons, sliders, text input boxes, drop-down menus, scroll-bars, and other inputs. One or more actions are typically taken within the interactive design in response to receiving user input at a design element. For example, receiving user input at a button of an interactive design might change an image that is displayed within an image viewer design element of the interactive design.

Interactive design prototyping software applications are often used in conjunction with software applications for generating specifications associated with an interactive design. The generated specifications can include specifications reporting defects found within the production software application, specifications requesting a change to be made for the production software application, specifications making suggestions for the production software application, and other specifications. In some instances, the specifications are generated by a design manager, by a product manager, by a team member, or by another group or individual. Generated specifications are typically received by a designer, a manager, a team, a programmer, or another group or individual associated with creating some aspect of the production software application. Specifications are sometimes delivered in the form of an email, a PDF, a web page, or as an entry in a defect tracking software system.

As a first simplified example, where the production software application is an application on a mobile phone, a privileged user (e.g., a "beta tester") of the application might notice that a graphical button on the application is off-centered. The privileged user then submits feedback to a defect tracking system, a designer of the interactive design for the production software application receives the feedback from the defect tracking system, and then the designer modifies the interactive design and creates a specification to address the submitted feedback. The interactive design and specification are then submitted to a defect tracking system and assigned to a programmer. As a second simplified example, where the production software application is a web page viewed on a web browser, a manager of a design team might want to change a color scheme of the production software application. In response, the manager submits feedback to a designer. The designer creates an interactive design and specifications to address the submitted feedback. The specifications are then sent to a programmer using e-mail.

Some tools for generating specifications provide for a user to enter a written description of the specifications, provide some limited context of how and where the interactive design is being consumed (e.g., some operating system and web browser information), as well as a screenshot of the interactive design. However, as the visual complexity of interactive designs grows, a screenshot may include significant extraneous information unrelated to the specifications being provided.

SUMMARY OF INVENTION

In some embodiments, a focused specification for an interactive graphical design is generated by receiving a first user input from a user, the first user input identifying a first design element of the interactive graphical design. A set of selectable data elements associated with the first design element is identified, and a specification template that includes the set of selectable data elements is generated. A second user input is received from the user, the second user input identifying a set of selected data elements using the generated specification template. The set of selected data elements includes one or more of the selectable data elements. The focused specification is generated using the set of selected data elements, the focused specification including the set of selected data elements and excluding selectable data elements that were not selected.

DETAILED DESCRIPTION OF THE EMBODIMENTS

Figure 1:
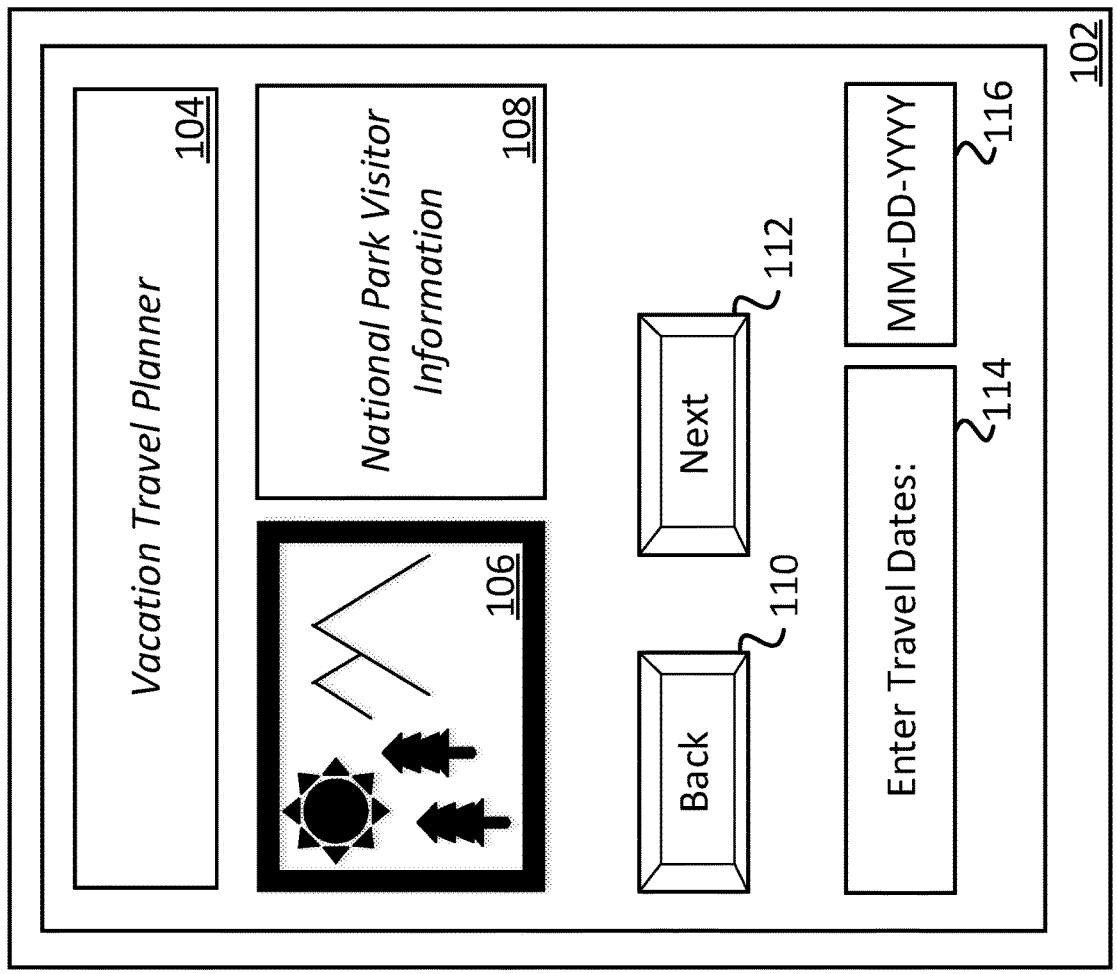
FIG. 1 illustrates a simplified example of an interactive design, as found in the prior art.

Interactive design prototyping tools are used to create interactive graphical designs to be used within web browsers, desktop applications, mobile devices, vehicles, stand-alone terminals such as point of sale systems and kiosks, among other uses. Interactive designs typically include multi-media design elements such as images, rendered graphics, videos, and animations, as well as design elements which can receive user input from a touch screen, a mouse, a physical dial, a physical button, a physical slider, or another input. Interactive designs and their associated design elements also have respective corresponding data elements such as assets (e.g., images, videos), content (e.g., text), and metadata that can include one or more sets of compiled instructions (e.g., JAVA), scripted instructions (e.g., JAVASCRIPT, PYTHON, PHP), mark-up and layout instructions (e.g., HTML, CSS, XML), redline markups, layout measurements, or other data (e.g., JSON, SQL, data objects, etc.). Design elements which can receive user input include graphical buttons, sliders, text input boxes, drop-down menus, scroll-bars, and other design elements known in the art.

Interactive design prototyping software applications are often used in conjunction with software applications for generating specifications associated with an interactive design. The generated specifications can include a report of defects found within a production software application, change requests for the production software application, suggestions for the production software application, and other specifications. Some tools for generating specifications provide for a written description of the specifications to be entered, provide some limited context of how and where the interactive design is being consumed (e.g., operating system and web browser information), as well as a screenshot of the interactive design. However, as the visual complexity of interactive designs grows, a screenshot may include significant extraneous information unrelated to the specifications being provided. As a result, when a defect or a change request for an interactive design is reported, a significant number of unrelated aspects of the interactive design might be included in the specification, thereby creating confusion, introducing further defects, or otherwise decreasing an efficiency of a team responsible for creating the interactive design. For example, a conventional specification might include a screenshot of an entire interactive design when, for example, only one attribute of a single button of the interactive design is the subject of the specifications. Additionally, conventional specifications may not include related assets, content, or metadata associated with design elements that are part of a specification. For example, when a designer receives a conventional specification to change, for example, a graphical button of an interactive design, the designer will then have to separately retrieve metadata such as asset files (e.g., JPEG, PNG, SVG, etc.), content, and other metadata associated with the button (e.g., HTML, JAVASCRIPT, CSS, etc.).

As disclosed herein, a "focused specification" advantageously displays a user-selected design element of interest (e.g., a button, a field, a header, a logo, a menu, an image, etc.) from an interactive design and advantageously excludes most other design elements that are not selected by the user. In some embodiments, all or a portion of design elements that are directly adjacent to the selected design element are also advantageously displayed in the focused specification. In some embodiments, a group or region of design elements can be selected and included in the focused specification. In such embodiments, all or a portion of design elements that are directly adjacent to the selected group of design elements are also displayed in the focused specification. In some embodiments, the focused specification automatically includes all or a portion (as selected) of assets and metadata data associated with the selected design element.

For example, given a scenario where a group manager would like his or her team to change a shape of a button design element within an interactive design, rather than displaying a screenshot of the entire interactive design, the focused specification advantageously displays the button design element, a portion of the design elements that are directly adjacent to the button design element, and any additional assets or metadata selected by the group manager.

In some embodiments, before the focused specification is generated, a specification template is displayed so that a user can choose to exclude one or more assets, content, or metadata associated with a selected design element. In other embodiments, a previously generated specification template is used to generate the focused specification and thus does not need to be displayed to the user before the focused specification is generated. The specification template enables a user to select which assets, content, and metadata associated with a selected design element is included in the generated focused specification. For example, if a user intends to generate a focused specification to request that a block of text be changed, the focused specification may not need to include additional elements, such as JAVASCRIPT code associated with a text display design element. Instead, the focused specification may just need to include the selected text display design element, a copy of the content displayed with the text display design element, and written instructions for the change request.

Additionally, in some embodiments, the specification template includes a user input interface to receive markup or free-form drawings which are displayed over one or more of the selected design elements, assets, content, metadata display, or other elements of the focused specification.

After desired assets, content, and metadata has been selected in the specification template, or after indicating a particular specification template is to be used (e.g., by user input or by a configuration file), a focused specification is generated. In some embodiments, the focused specification is displayed (i.e., previewed) to a user before being generated in a selected focused specification format. In other embodiments, the focused specification is directly generated in a selected focused specification format from a specification template interface. In some embodiments, the focused specification is exported (i.e., generated and optionally sent) to a defect or job tracking software application, to a revision tracking software application, to a presentation application, to an automatically generated email or to an email client, to a webpage, to a document format such as a PDF or WORD format, or to another application or exported format.

Depending on where and in which format the focused specification is generated, some elements of the focused specification may be transformed from a format that is incompatible with the generated format to a format that is compatible with the generated format. For example, if the focused specification contains a "clickable" link to an asset (i.e., a link or button that downloads an asset upon being activated), such a link could be included in focused specification exported to an email format. Upon clicking the link in the exported email, a user could download a copy of the asset associated with the link. However, if the focused specification is exported to a defect tracking software application format, a clickable link may not be supported. Thus, in some embodiments, some design elements of the focused specification having a first incompatible format may be transformed to design elements having a second compatible format when the focused specification is generated. As another example, if the first format is a video asset or animated asset, the second format might be a still image. Or, if the first format is a block of editable text, the second format might be a non-editable image of the text.

FIG. 1 illustrates a simplified example of an interactive graphical design ("interactive design") 102, as found in the prior art. In general, the interactive design 102 includes multiple design elements. The multiple design elements include a header design element 104, a multimedia design element 106 (e.g., including one or more of audio, video, and image assets), a first text display design element 108, a back button design element 110, a next button design element 112, a second text display design element 114, and a text entry design element 116. Other design elements could include, but are not limited to, scroll bars, drop-down menus, radio buttons, sliders, knobs, free-form drawing fields, frames, embellishments, and so on.

Figure 2:
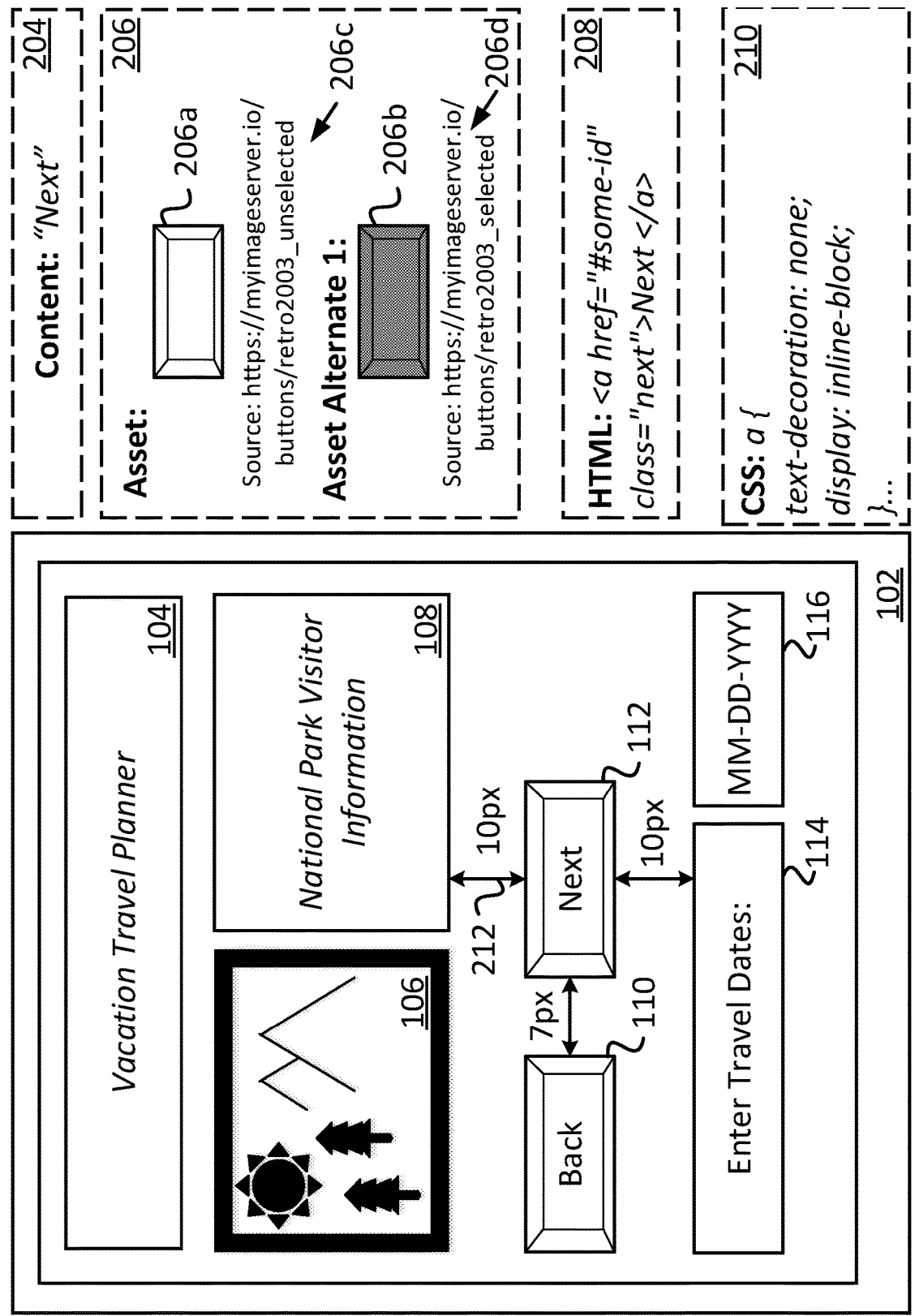
FIG. 2 illustrates simplified examples of some design elements of the interactive design shown in FIG. 1, in accordance with some embodiments.

The design elements of the interactive design 102 are associated with underlying assets, content data, and metadata that determine, at least in part, a behavior, layout, and appearance of that design element. FIG. 2 illustrates simplified examples of associated assets, content, and metadata of some of the design elements of the interactive design 102, in accordance with some embodiments. For example, the next button design element 112 is associated with content data 204, which includes text data (e.g., ASCII data) that is displayed within the next button design element 112. The back button design element 110 and the next button design element 112 are associated with assets 206. The assets 206 include a default asset 206a (e.g., a JPEG, PNG, SVG, MP4, GIF, etc.) which is displayed when either of the respective button design elements 110, 112 is in a first state (e.g., unselected), and an alternate asset 206b (a e.g., JPEG, PNG, SVG, MP4, GIF, etc.) which is displayed when either of the respective button design elements 110, 112 is in a second state (e.g., selected). In this example, the default asset 206a is stored at a storage location such as a remote or local compute node (e.g., a server) and can be downloaded by a user or an application by following a default asset link 206c. The alternate asset 206b is also stored at a remote or local compute node and can be downloaded by a user or an application by following an alternate asset link 206d.

The next button design element 112 is also associated with HTML metadata 208 and CSS metadata 210, the metadata 208, 210 determining in part a layout, behavior, and display of the next button design element 112. The next button design element 112 is additionally associated with positioning data such as layout metadata 212 (i.e., redline information) that represents a determined distance (in pixels (px), as a percentage of a screen/window, in absolute distance (mm or inches), etc.) from the next button design element 112 to neighboring design elements 108, 110, and 114.

Figure 3:
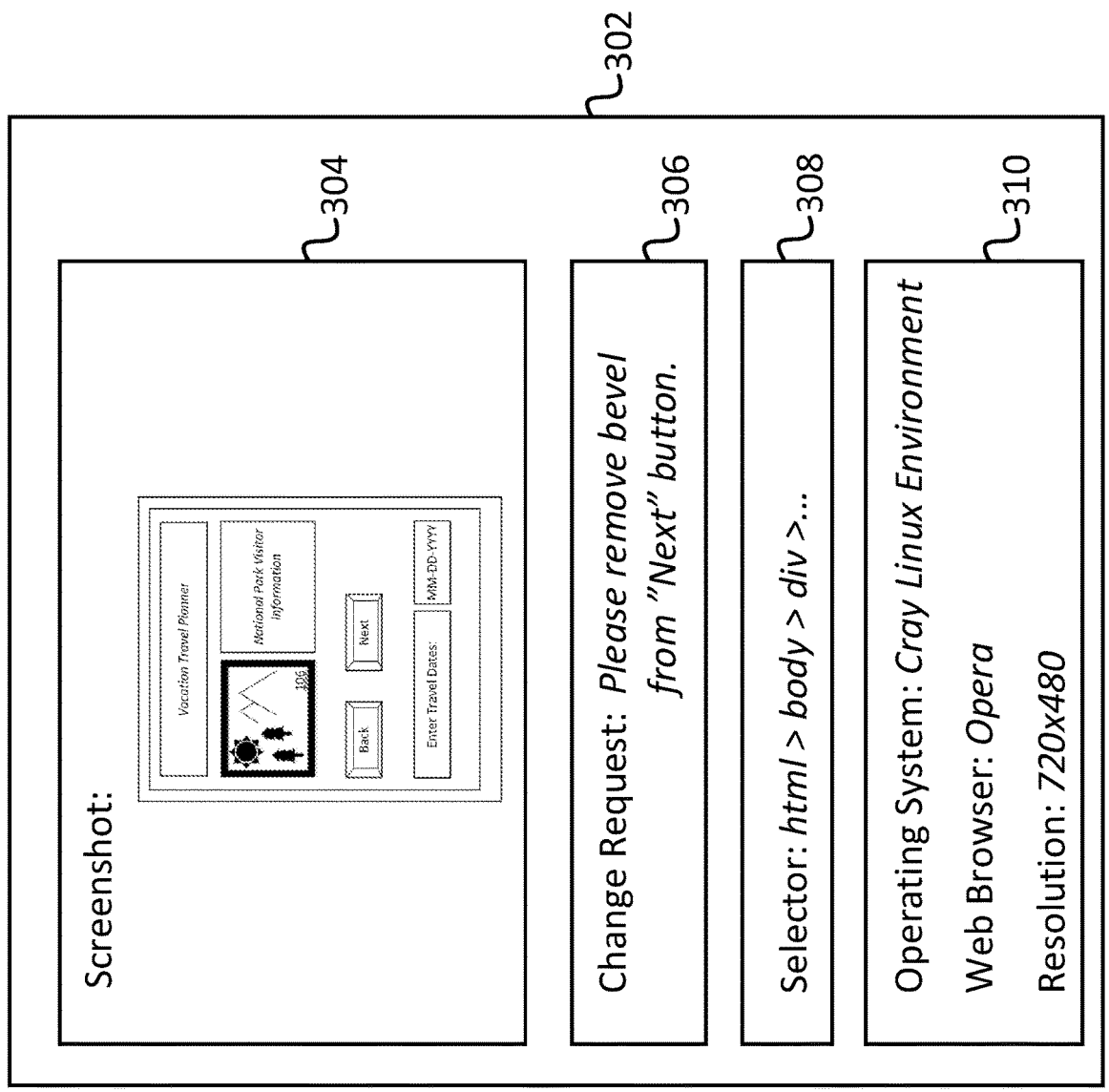
FIG. 3 illustrates a simplified example of a specification associated with the interactive design shown in FIG. 1, as found in the prior art.

Very little of such useful assets, content data, and metadata is included in conventional specifications, and instead superfluous information that is possibly unrelated to the defect or change request being reported is often included in conventional specifications. FIG. 3 illustrates a simplified example of a conventional specification 302 associated with the interactive design 102, as found in the prior art. The conventional specification 302 generally includes a screenshot 304 of the entire interactive design 102, a change request data element 306, selector information 308, and operational context information 310. The screenshot 304 is conventionally a static image. That is, the screenshot 304 does not have individually selectable or separable elements, objects, or sub-images, and does not focus on a particular design element of the interactive design 102. Thus, a user might have to use a portion of the possibly limited allotted text in the change request data element to indicate which portion of the screenshot 304 the change request or defect specification pertains to. The selector information 308 might pertain to the entirety of the interactive design 102 and not pertain to a particular design element of the interactive design 102. The context information 310 might include information such as a web browser (e.g., OPERA) that rendered the interactive design 102 when the conventional specification 302 was created, an operating system that was running the web browser (e.g., CRAY LINUX ENVIRONMENT), and a resolution at which the interactive design 102 was rendered (e.g., 720×480). While sometimes useful, such context information 310 might only detract or mislead a designer addressing the defect or change request.

As shown, when a defect or a change request for the interactive design 102 is reported using a convention specification such as the conventional specification 302, a significant number of unrelated aspects of the interactive design are included in the specification, thereby creating confusion, inviting further defects, or otherwise decreasing an efficiency of a team responsible for creating the interactive design. For example, even though the change request 306 requests that a bevel graphical embellishment be removed from the next button design element 112, the conventional specification 302 includes the screenshot of the entire interactive design 102. Additionally, the conventional specification 302 does not automatically include the assets 206 for the next button design element 112, thereby requiring that a user creating the specification manually upload and attach the assets 206 to the specification or requiring the designer responding to the conventional specification 302 separately locate the assets 206. For example, when a designer receives the conventional specification 302 the designer will have to separately locate and retrieve asset files (e.g., JPEG, PNG, SVG, etc.) associated with the next button design element 112, and will additionally have to separately retrieve metadata associated with the next button design element 112 (e.g., HTML, JAVASCRIPT, CSS, etc.).

Additionally, even though the change request 306 of the conventional specification 302 is directed to a narrow scope that includes a simple graphical change (i.e., to remove a bevel), extraneous information such as the selector information 308 and the operational context information 310 is included in the conventional specification 302. As a result, a designer receiving the conventional specification 302 may mistakenly believe that the scope of the change request 306 is different or broader than the user that created the conventional specification 302 intended. Such superfluous information in the conventional specification 302 may be distracting or misleading.

In summary, conventional specifications such as the conventional specification 302 disadvantageously do not allow a user creating the specification to assign appropriate focus to the defect or change request being specified, might not include assets, content data, or metadata that is useful to a designer addressing the conventional specification 302, while at the same time including data and information that is not relevant to the defect or change request being specified.

Figure 4:
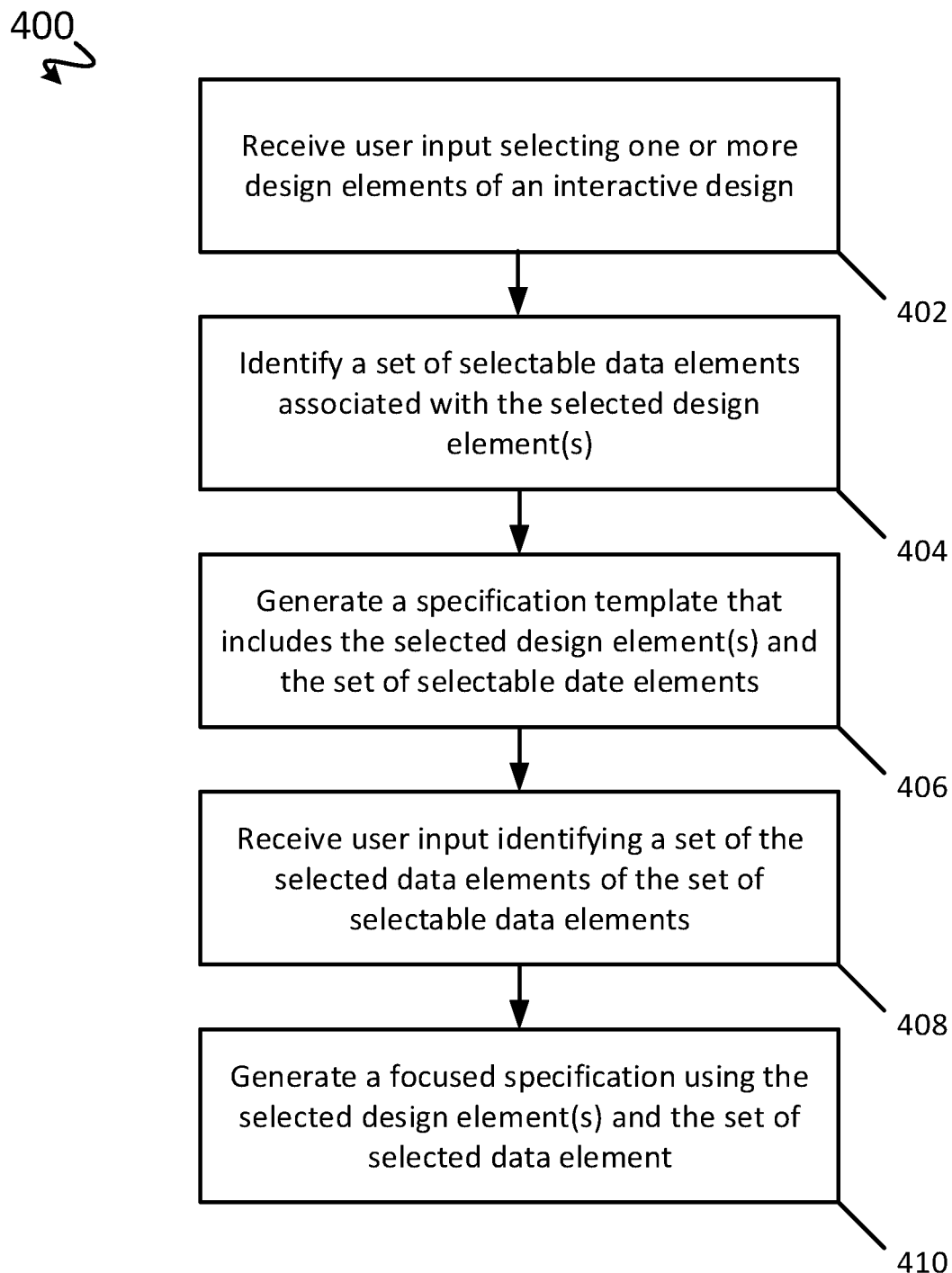
FIG. 4 illustrates a simplified portion of a process for generating a focused specification for an interactive design, in accordance with some embodiments.
Figure 5:
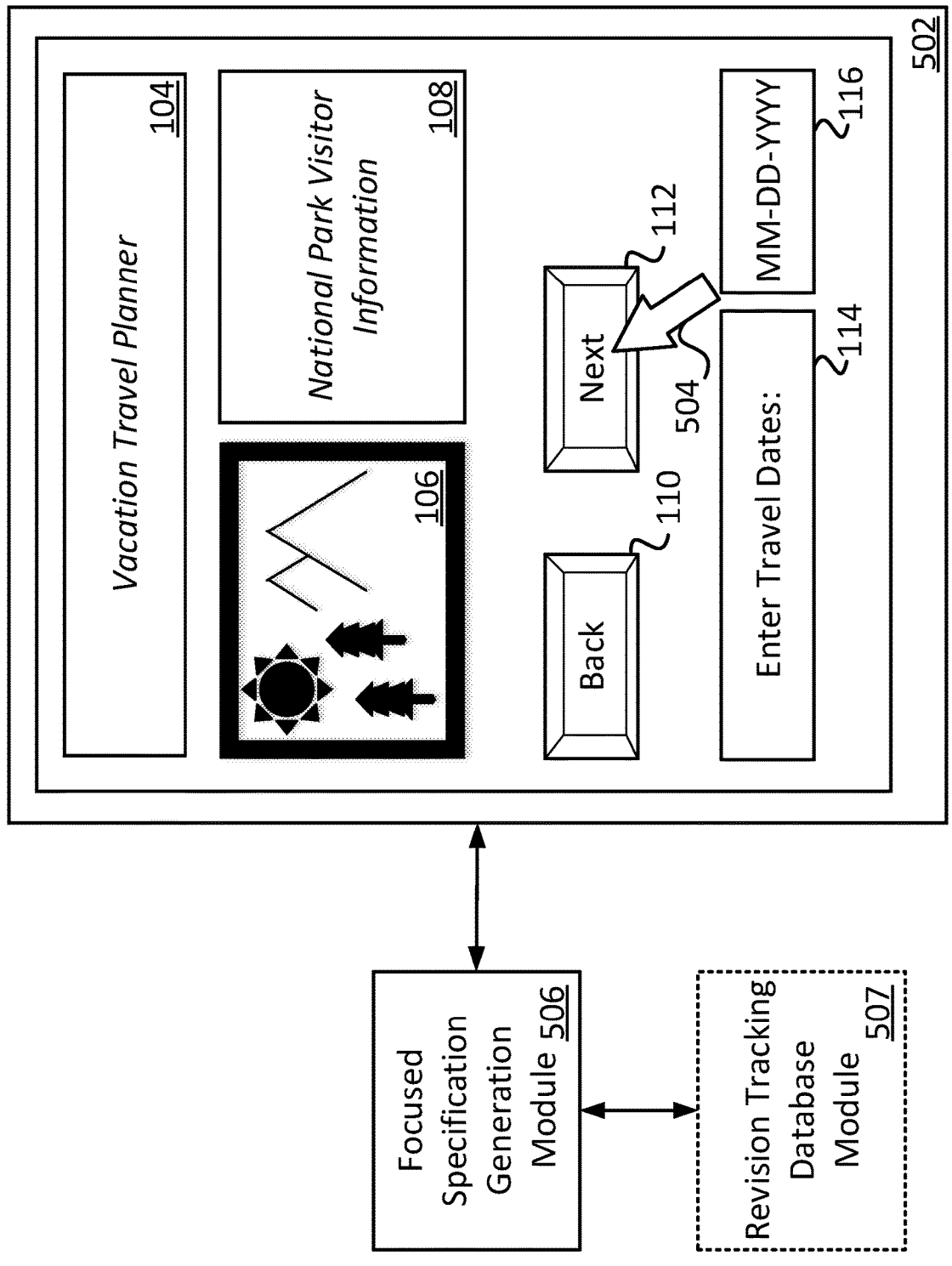
FIG. 5 illustrates receiving user input at a design element of the interactive design shown in FIG. 1, in accordance with some embodiments.

FIG. 4 illustrates a simplified portion of a process 400 for generating a focused specification for an interactive design, in accordance with some embodiments. The particular steps, the order of steps, and the combination of steps are shown for illustrative and explanatory purposes only. Other embodiments can implement different particular steps, orders of steps, and combinations of steps to achieve similar functions or results. Steps of the process 400 are described with reference to FIG. 5 through FIG. 13. At step 402, user input identifying one or more design elements of an interactive design is received. In some embodiments, the user input is received by a specification interface via a mouse click, a mouse selection, a touch screen selection, or other user input. For example, FIG. 5 illustrates a simplified specification interface 502 for receiving user input 504 which selects, in this example, the next button design element 112 of the interactive design 102 and communicates an indication of the selection to a focused specification generation module 506. In some embodiments, the focused specification generation module 506 is instantiated (i.e., executed, installed, or running) at a same compute node as the specification interface 502. In other embodiments, the focused specification generation module 506 is part of the specification interface 502. In yet other embodiments, the focused specification generation module 506 and/or the specification interface 502 are part of the interactive design 102. In still yet other embodiments, the focused specification generation module 506 is not located or instantiated at the same compute node as the specification interface 502. In some embodiments, the focused specification generation module 506 receives a copy of the interactive design 102 and some or all of the assets, content, and metadata associated with the interactive design 102. In other embodiments, the focused specification generation module 506 communicates with one or more compute nodes to the retrieve assets, content, and metadata associated with the interactive design 102. In some embodiments, the focused specification generation module 506 communicates with a revision tracking database module 507 to retrieve revision information regarding one or more of the design elements selected by the user input 504. For example, in some embodiments the focused specification generation module 506 retrieves previous versions of underlying assets and metadata of the design elements selected by the user input 504 for display in a generated focused specification. Such embodiments are described further with respect to FIG. 10 and FIG. 11.

In some embodiments, the specification interface 502 is an interface overlying the fully functional interactive design 102 which receives user input for specification generation but is not normally visible to a user of the interactive design 102. In other embodiments, the specification interface 502 is or includes a separate rendering or representation of the interactive design 102 and does not include all of the functionality of the interactive design 102. In still other embodiments, the specification interface 502 is implemented as one or more specification callback functions associated with one or more of the design elements of the interactive design 102, the specification callback functions being different than callback functions associated with the design elements of the interactive design 102 during non-specification generation operation. In still yet other embodiments, the specification interface 502 is implemented as an alternate click or selection type that indicates that the user input 504 is associated with a specification generation selection.

Figure 6:
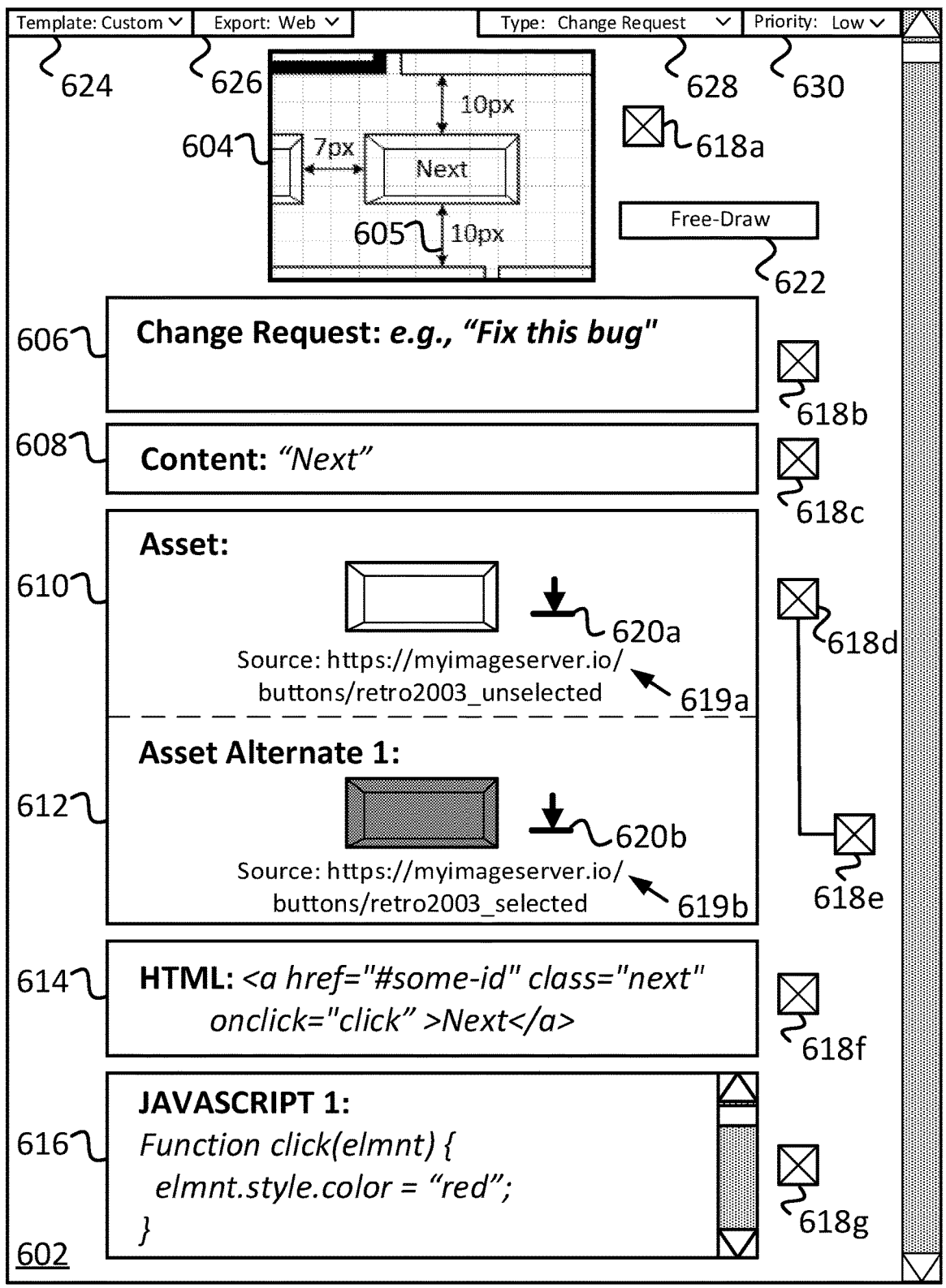
FIG. 6 illustrates a simplified specification template associated with the interactive design shown in FIG. 1 and based on the user input shown in FIG. 5, in accordance with some embodiments.

Returning to FIG. 4, at step 404, a set of selectable data elements associated with the selected design element(s) is identified. In some embodiments, the set of selectable data elements is identified by the specification interface 502 and the specification interface 502 transmits an indication of the selected design elements(s) to the focused specification generation module 506. At step 406, a specification template that includes the selected design element(s) and the set of selectable data elements is generated. In some embodiments, the specification template is generated by the focused specification generation module 506. FIG. 6 illustrates a simplified specification template 602 generated by the focused specification generation module 506 based on the user input 504 shown in FIG. 5, in accordance with some embodiments.

In some embodiments, the specification template 602 is a user interface that is configured to receive user input to select which of the selectable data elements of the specification template 602 is added to the focused specification. The selectable data elements are advantageously automatically identified by the focused specification generation module 506 using the interactive design 102 based on the user input 504, which selected the design element 112, as opposed to a conventional system that requires the user to manually search for and upload or attach such assets, content or metadata. In some embodiments, the specification template 602 is an overlay of the interactive design 102 or is displayed by a software application that includes the interactive design 102. In other embodiments, the specification template 602 is displayed by a software application that does not include the interactive design 102. In still other embodiments, the specification template 602 is, or includes, a previously saved specification template configuration. A specification template configuration is a file or data object that indicates which selectable data elements of a specification template are or were selected. In some embodiments, the specification template 602 is populated with each of the possible selectable data elements associated with the one or more design elements selected based on the user input 504. In other embodiments, the specification template 602 is populated with a subset of the possible selectable data elements associated with the one or more design elements selected based on the user input 504. In still other embodiments, the specification template 602 is initially blank, and selectable data elements associated with the one or more selected design elements are added by user input received at the specification template 602.

In general, the simplified example specification template 602 includes a selectable representation data element 604 of the selected design element, selectable layout or positioning data elements 605, a selectable change request data element 606, a selectable content data element 608, a selectable asset data element 610, a selectable alternate asset data element 612, a first selectable metadata data element 614 (e.g. HTML), a second selectable metadata data element 616 (e.g., JAVASCRIPT), selectors 618*a-g* that correspond to the respective selectable data elements, asset links 619*a-b*, asset download buttons 620*a-b*, a free-draw enable button 622, a focused specification template selection interface 624, a focused specification export type (i.e., generated format) selection interface 626, a focused specification type interface 628, and a focused specification priority type selection interface 630.

The selectors 618*a-g* control the inclusion or exclusion of data elements from the focused specification based on user input received at the selectors 618*a-g*. For example, the selectable representation data element 604 of the selected design element can be included in the focused specification based on user input selecting the selector 618*a* or be excluded from the focused specification based on user input deselecting the selector 618*a*. The selectors 618*a-g* are a simplified example of a user interface for such selection. Other user input interfaces as are known in the art could accomplish the same action of selecting or deselecting a data element, for example, a long press, swiping a data element to the left or to the right, an alternate mouse click, dragging-and-dropping data elements onto the specification template, etc.

The selectable representation data element 604 illustrates the selected design element (e.g., the next button design element 112) and all or a cropped view of design elements directly adjacent to the selected design element (e.g., the design elements 106, 108, 110, 114, 116). The cropped view is advantageously automatically generated by the focused specification generation module 506 based on the user input 504 which selected the design element 112, as compared to conventional specifications which might include a screenshot of an entire interactive design. A cropped view is a graphical representation of one or more design elements that excludes a portion of a full graphical representation of those design elements. A design element is directly adjacent to a selected design element if there are no additional design elements between the selected design element and the directly adjacent design element, wherein the additional design elements include any design elements that substantially obscure (e.g., more than 50%) a direct line of sight between the selected design element and the directly adjacent design element. However, in some embodiments, all or a portion of a background design element may intervene between a selected design element and a directly adjacent design element. In some embodiments, the design elements that are directly adjacent to the selected design element can be selectively added or removed from the selectable representation data element 604 (e.g., by a selector similar to the selectors 618*a-g*). In some embodiments, the selectable representation data element 604 is a non-responsive image or other representation of the selected design element. In other embodiments, the selectable representation data element 604 is a responsive (e.g., to user input) representation or copy of the selected design element, the selectable representation data element 604 having all or a limited subset of the selected design element's functionality. For example, in some embodiments, clicking the representation of the "next" button within the selectable representation data element 604 will change a state of the "next" button within the selectable representation data element 604. In some embodiments, if a state of the selectable representation data element 604 is changed, other selectable fields of the specification template 602 are updated accordingly. As one simplified example, if the representation of the "next" button within the selectable representation data element 604 is clicked such that the state of the "next" button changes, asset 612 would become the "Asset" and asset 610 would become the "Asset Alternate."

The selectable layout or positioning data 605 can be included in the focused specification to provide layout and positioning data of the selected design element as it relates to the design elements directly adjacent to the selected design element. In some embodiments, horizontal and vertical positioning data can be independently selected. In other embodiments, each positional relationship of the positioning data can be independently selected. For example, in such embodiments, just the positioning data corresponding to a horizontal distance between a first design element and a second design element could be selected. In some embodiments, the focused specification generation module 506 uses metadata (e.g., HTML, CSS) associated with design elements of the interactive design to identify positioning data that corresponds to a positional relationship between the selected design element and one or more other design elements (e.g., a directly adjacent design element, another design element, an edge of a containing design element such as a frame or border of the interactive design 102, etc.). The focused specification generation module 506 then generates a visual representation of the identified positioning data (e.g., by rendering lines, arrows, text, and numerical displays, or other representations, optionally including distance data) In some embodiments, identifying the positioning data 605 by the focused specification generation module 506 includes generating the positioning data 605 based on positioning data associated with the selected design element and positioning data of the one or more other design elements.

The selectable change request data element 606 can be included in the focused specification to include text data entered by a user or from a configuration file, the text data being text-based instructions, comments, or other relevant text.

The selectable content data element 608 can be included in the focused specification to include text or other content (e.g., time, date, numerical values, tables, or other textual data objects) associated with the selected design element.

The selectable asset data element 610 and the selectable alternate asset data element 612 can be included in the focused specification to include any assets associated with the selected design element and are advantageously identified by the focused specification generation module 506 (e.g., using the interactive design 102). Such automated identification of assets, content, and metadata is superior to conventional specifications which might require a user to separately locate and upload or attach assets, content, or metadata to the specification. In some embodiments, the asset data elements 610, 612 includes separately selectable assets (via the selector 618*d*) and selectable asset alternates (via the selector 618*e*). In some embodiments, the selectable asset data elements 610, 612 additionally includes the links 619*a-b* to each asset and asset download buttons 620*a-b* corresponding to each asset. In this example, the links 619*a-b* corresponds to data (i.e., the respective assets) stored at a storage location such as a remote or local compute node (e.g., a server) which can be downloaded by a user or an application by following the links 619*a-b*.

The first and second selectable metadata data elements 614, 616 can be included in the focused specification to include human-readable software instructions (i.e., software languages, or "code") such as HTML, JAVASCRIPT, CSS, PYTHON, C, C++, PHP, XML, JSON, JAVA, or other metadata associated with the selected design element. Though only the first and second selectable metadata data elements 614, 616 are shown, it is understood that more or fewer selectable metadata data elements can be included in the specification template 602. In some embodiments, metadata data elements associated with the selected design element advantageously include only portions of metadata that pertains directly to the selected design element, as compared to conventional specifications which might include metadata pertaining to the entirety of the interactive design. As just one example, though the interactive design 102 may be associated with one or more HTML files, the selectable metadata data element 614 only includes portions of the HTML file(s) that directly pertain to the selected design element. In some embodiments, the focused specification generation module 506 advantageously automatically identifies the portions of the HTML file(s) that directly pertain to the selected design element using code inspection and analysis software processes that are well known in the art. In some embodiments, the portion of metadata that directly pertains to the selected design element is initially displayed in the selectable metadata data elements 614, 616 and a remaining portion of the metadata is collapsed (i.e., shown only as an indicator, such as a "plus button", that there is additional metadata). In such embodiments, a user may expand the collapsed portion of the metadata to view metadata that does not directly pertain to the selected design element. For example, HTML metadata directly pertaining to the selected design element 112 may initially be displayed as metadata 614, and HTML metadata pertaining to a higher-level context (e.g., body, div, etc.) of the interactive design 102 may be initially collapsed.

The free-draw enable button 622 enables a user to draw (e.g., add lines, shapes, patterns, etc.), annotate (add icons, text, etc.), or otherwise mark-up the generated specification. Free-draw data drawn on the specification template after the free-draw enable button 622 is enabled is rendered on the generated focused specification. In some embodiments, the free-draw data is stored separately from the generated focused specification (e.g., as a separate graphical layer) so that the free-draw data can be selectively removed or hidden by a user viewing the focused specification. In some embodiments, user input to add the free-draw data includes user input to select a color, line thickness, pattern, or other template of the free-draw data. User input to enter the free-draw data can also select an erase input to erase all or a portion of previously added free-draw data.

The optional focused specification template selection interface 624 enables a user to select a specification template type. In some embodiments, the specification template type includes previously saved, preferred, default, and/or custom specification template types. For example, a user who primarily generates specifications related to purely graphical aspects of an interactive design may prefer a specification template that has the selectable representation data element 604 selected by default, and the selectable metadata data elements 614, 616 deselected by default. As another example, a user who primary generates focused specifications to be added to a defect tracking software application may prefer that the asset data elements 610, 612 do not include the asset download buttons 620*a-b* if the defect tracking software application does not support such buttons.

The optional focused specification export type selection interface 626 enables a user to select in which format the focused specification is generated and, in some cases, transmitted. Selectable focused specification export types include, but are not limited to data objects or files compatible with job tracking software applications, revision tracking software applications, defect tracking software applications, team communication software applications, social media software applications, presentation software applications, emails or formats compatible with email authoring software applications, webpages or other web-based media compatible with web browsers, document formats such as a PDF or WORD formats or other formats compatible with document authoring software applications, formats displayable in the interactive design 102 or as another interactive design, or other software applications or exported formats. Based on which export type is selected, some of the selected data elements are transformed upon specification generation from a first format to a second format. That is, upon identifying the specification export type selection by the focused specification generation module 506, the focused specification generation module 506 may identify selected data elements that are of a compatible format and selected data elements that are of an incompatible format. Selected data elements that are identified by the focused specification generation module 506 to be of an incompatible format are advantageously automatically transformed by the focused specification generation module 506 to be of a compatible format before the selected data element is added to the generated specification. Such automatic transformation is superior to conventional specifications which might require a user to use another software application (e.g., an image editing software application) to transform between formats. Selected data elements that are identified by the focused specification generation module 506 to be of a compatible format can be added to the generated specification by the focused specification generation module 506 without transformation.

As a first simple example, some generated specification formats might not permit SVG format images to be displayed and instead only allow JPEG and PNG format images to be displayed. Thus, in this example, SVG would be an incompatible format, and JPEG would be a compatible format. The focused specification generation module 506, therefore, would transform the SVG image to a JPEG image using image format conversion software processes that are well known in the art.

As another example, if the selectable representation data element 604 includes an animation or a video, such assets may be transformed by the focused specification generation module 506 to one or more still images using video format conversion and or frame capture software processes that are well known in the art if the focused specification export type does not support animation or video content.

As yet another example, some specification formats might not display software objects such as a link to an asset or an image storage location, clickable design elements, scroll bars, text with formatting data, or dynamically displayed regions such as "flyouts", "tooltips" or other content that is hidden until an action is taken by a user (e.g., by hovering over a design element, clicking a button such as "show more", and so on), and instead only allow a JPEG or PNG representation of the software object to be displayed. Thus, in this example, the software object would be an incompatible format, and a JPEG or PNG would be a compatible format. The focused specification generation module 506, therefore, would transform the software object to a JPEG or PNG image using image format conversion processes that are well known in the art.

The optional focused specification type interface 628 enables a user to select what type of focused specification is to be generated, thereby determining which selectable data elements are displayed, or selected by default, in the specification template 602. For example, if the focused specification type is a change request, then the selectable change request data element 606 is included or selected by default in the specification template 602. If the focused specification type were instead a defect specification type, a selectable defect specification data element might instead be included or selected by default in the specification template 602. Selectable focused specification types can include, but are not limited to, change request specifications, defect specifications (e.g., "bug" reports), milestone reports, status reports, feedback, invoicing reports, revision specifications, media specifications (e.g., marketing previews, social media previews, etc.), customer service specifications, or other specifications.

The optional focused specification priority type selection interface 630 enables a user to assign or indicate a priority to a generated focused specification. Selectable focused specification priority types can include but are not limited to low priority, medium priority, and high priority. For example, a change request specification may be assigned a medium priority, while a defect specification may be assigned a high priority.

Figure 7:
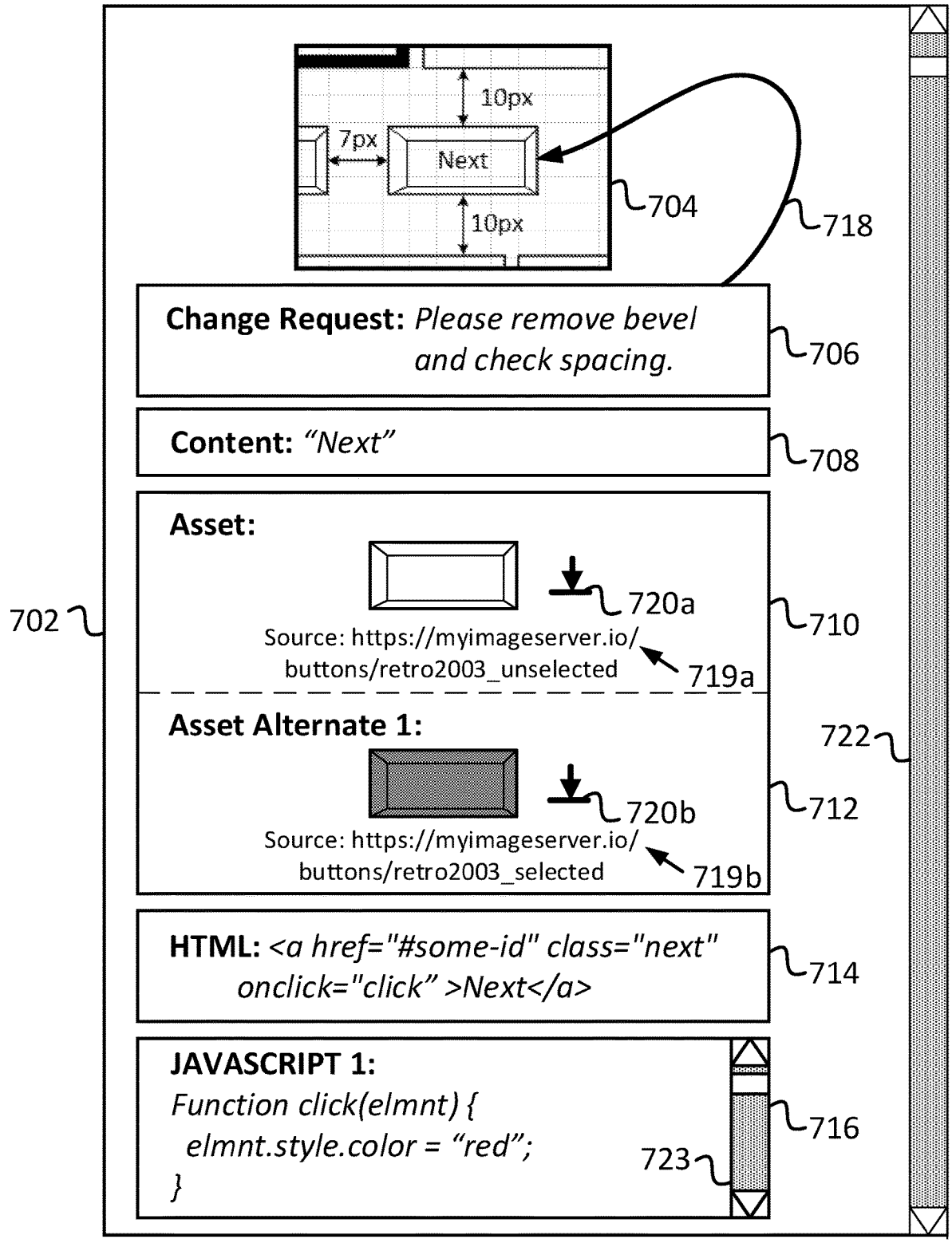
FIG. 7 illustrates a simplified focused specification generated based on the simplified specification template shown in FIG. 6, in accordance with some embodiments.

Returning attention to FIG. 4, after the specification template 602 is generated at step 406, at step 408 user input (e.g., using the selectors 618a-g) identifying a set of the selectable data elements of the set of selectable data elements (e.g., the data elements 604, 606, 608, 610, 612, 614, 616) is received (e.g., by the focused specification generation module 506) as was previously described. At step 410, a focused specification is generated by the focused specification generation module 506 (i.e., exported) using the selected design elements (e.g., the next button design element 112) and the set of selected data elements. FIG. 7 illustrates a simplified focused specification 702 generated at step 410 of the process 400 based on the simplified specification template 602 shown in FIG. 6, in accordance with some embodiments.

The focused specification 702 generally includes a selected representation data element 704 which includes a representation of a selected design element (e.g., the next button design element 112) of the interactive design 102, as well as the layout and positioning data associated with the selected design element, a selected change request data element 706, a selected content data element 708, a selected asset data element 710, a selected alternate asset data element 712, a first selected metadata data element 714 (e.g., HTML), a second selected metadata data element 716 (e.g., JAVASCRIPT), free-draw data 718 (e.g., an arrow), asset links 719a-b, asset download buttons 720a-b, and scrollbars 722, 723.

The focused specification 702 includes at least the selectable data elements from the specification template that were selected by the corresponding selectors 618a-g. In the example shown, the focused specification 702 has been exported to a format that supports the asset download buttons 720a-b. Some example focused specification export formats that could include the asset download buttons 720a-b include emails, web-based specifications, PDF-based specifications, and so on. Some example focused specification export formats that could exclude the asset download buttons 720a-b might include defect or change reporting software applications.

The scrollbars 722, 723 enable a recipient of the focused specification 702 to scroll through all of the selected data elements that are included in the focused specification 702 if the selectable data elements exceed a view area of the focused specification (e.g., a window, frame, or page). In some embodiments, one or more of the selected data elements of the focused specification 702 have independent scrollbars if the content, asset, or metadata displayed in a selected data element exceeds a view area of that selected data element. For example, the second selected metadata data element 716 includes the scrollbar 723 because metadata displayed in that data element (e.g., JAVASCRIPT) exceeds a view area of the second selected metadata data element 716.

The free-draw data 718 represents a drawing, mark-up, or other annotation entered by the user (e.g., drawn) on top of the specification template upon selecting the free-draw enable button 622. The free-draw data 718 is advantageously stored separately from the selected representation data element 704 (e.g., in a separate graphics layer) so that the free-draw data 718 can later be edited, moved, or removed.

Figure 8:
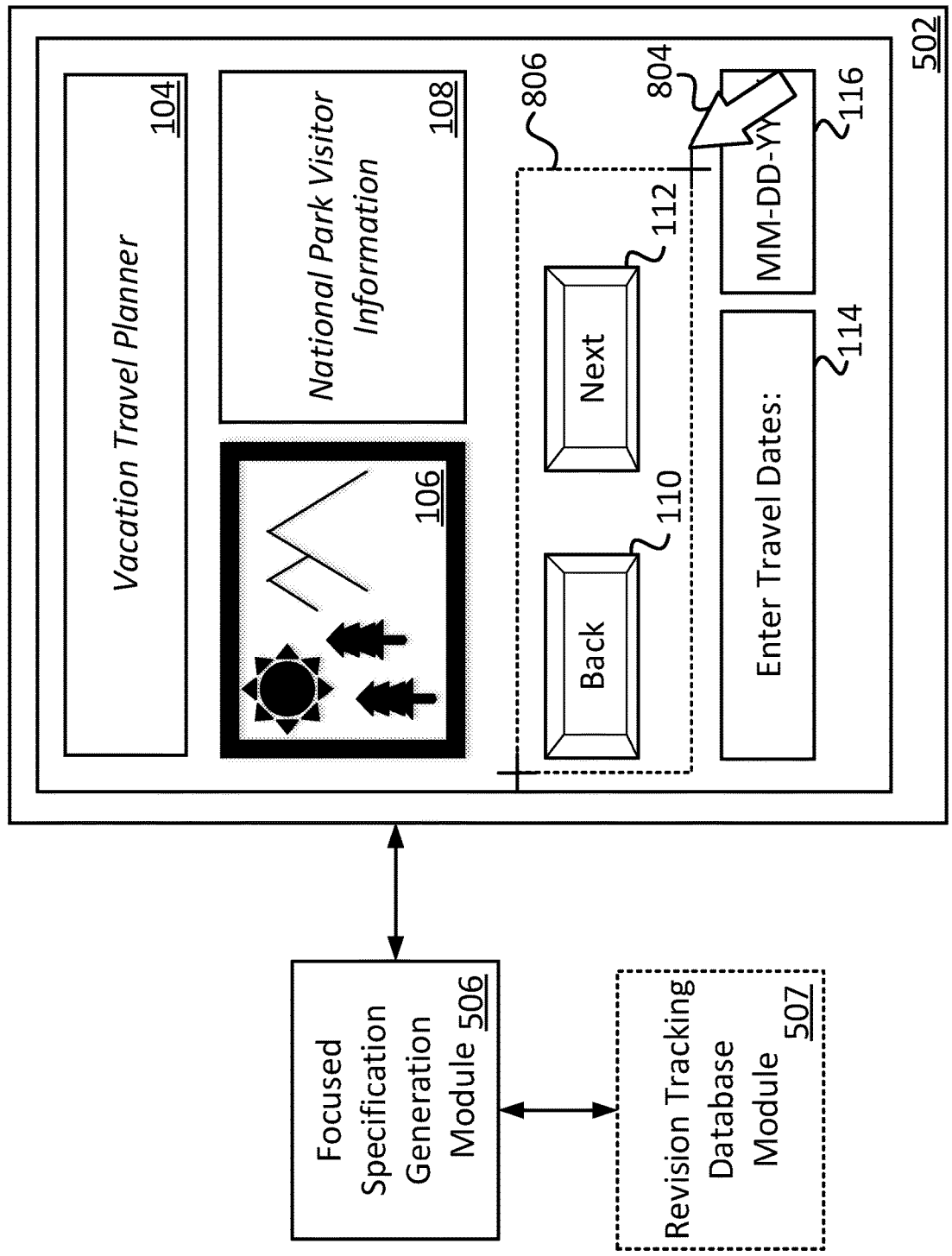
FIG. 8 illustrates receiving user input at a group of design elements of the interactive design shown in FIG. 1, in accordance with some embodiments.

Though the focused specification 702 only shows one design element having been selected (i.e., the next button 112), more than one design element, or in some cases the entirety of the design elements of the interactive design 102 may be selected. For example, FIG. 8 illustrates the simplified specification interface 502 for receiving user input 804 (i.e., a selection box 806 which selects the next button design element 112 and the back button design element 110 of the interactive design 102) and communicating an indication of a selection to the focused specification generation module 506, in accordance with some embodiments. Upon selection of the multiple design elements 110, 112, a specification template similar to the specification template 602 is generated by the focused specification generation module 506, thereby enabling a user to select one or more selectable data elements to be included in a focused specification. Selecting a single design element or multiple design elements of an interactive design is distinctly different than cropping a screenshot of an interactive design. Notably, when a single or multiple design elements of the interactive design are selected (e.g., by the user input 804), underlying assets, content, and metadata associated with the respective multiple design elements are identified (e.g., by the focused specification generation module 506) and in some embodiments automatically added as selectable data elements to a subsequent specification template. By comparison, cropping a screenshot of an interactive design simply graphically excludes a region of the interactive design but does not initiate or contribute to an identification of corresponding underlying assets, content, and metadata.

Figure 9:
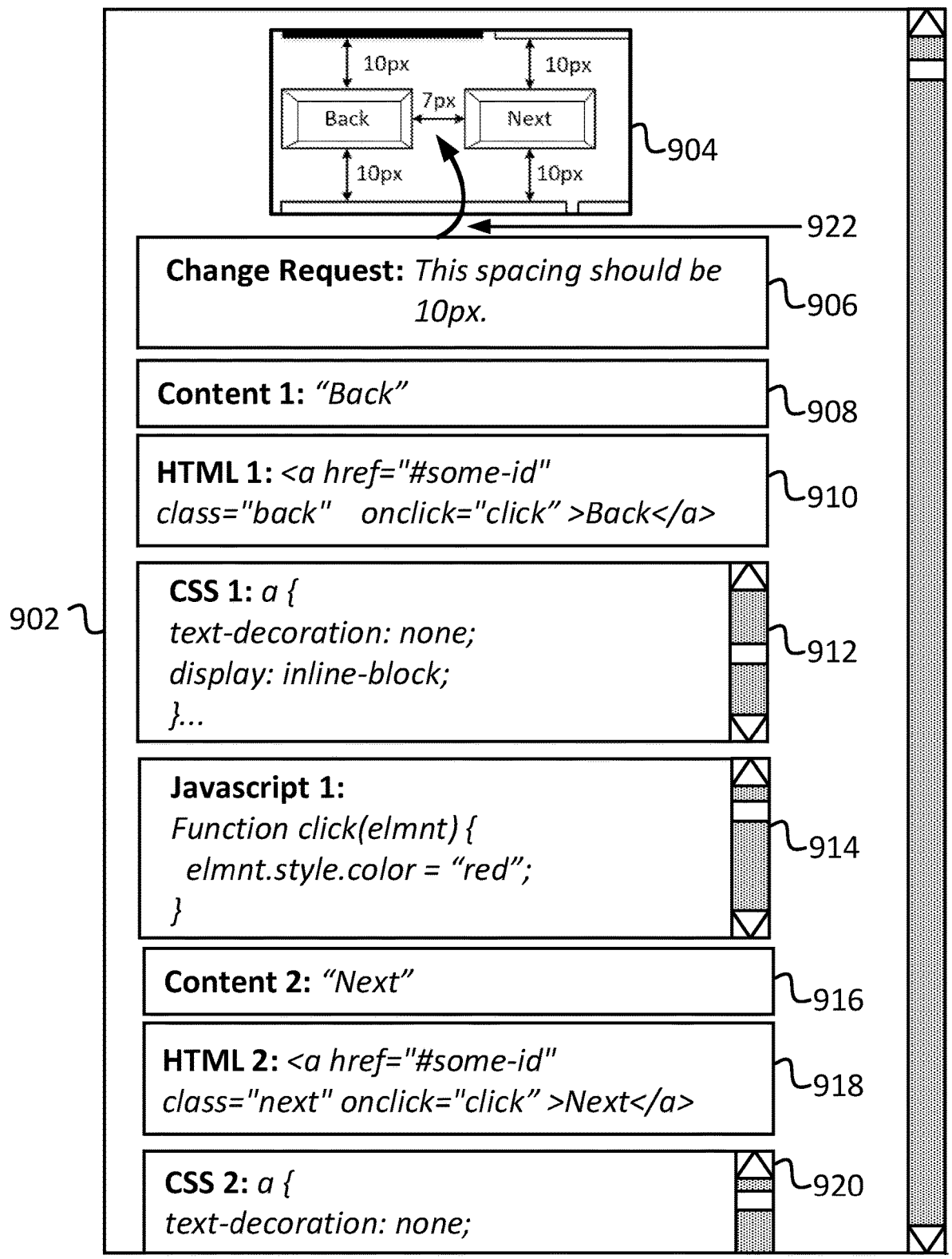
FIG. 9 illustrates a simplified focused specification generated based on a specification template that is similar to that shown in FIG. 7 and further based on the user input shown in FIG. 8, in accordance with some embodiments.

An example focused specification 902 that is generated based on the user input 804 is shown in FIG. 9, in accordance with some embodiments. Because the user input 804 selected, via the selection box 806, two design elements 110, 112, assets and metadata associated with the selected design elements 110, 112 are added to a specification template (not shown) similar to the specification template 602. Additionally, all, or a cropped portion, of the design elements of the interactive design 102 that are directly adjacent to the selected design elements 110, 112 (e.g., the design elements 106, 108, 114, 116) are included in a selectable representation data element, similar to the selectable representation data element 604 of the specification template 602.

The focused specification 902 generally includes a selected representation data element 904 which includes first and second selected design elements (e.g., the back button design element 110, and the next button design element 112) of the interactive design 102, as well as layout metadata (e.g., the layout metadata 212) associated with the selected design elements, a selected change request data element 906, a first selected content data element 908 that is associated with the first selected design element (e.g., the back button design element 110), a first selected metadata data element 910 (e.g., HTML) that is associated with the first selected design element, a second selected metadata data element 912 (e.g., CSS) that is associated with the first selected design element, a third selected metadata data element 914 (e.g., JAVASCRIPT) that is associated with the first selected design element, a second selected content data element 916 that is selected with the second selected design element (e.g., the next button design element 112), a fourth selected metadata data element 918 (e.g., HTML) that is associated with the second selected design element 112, a fifth selected metadata data element 920 (e.g., CSS) that is associated with the second design element, and free-draw data 922.

Figure 10:
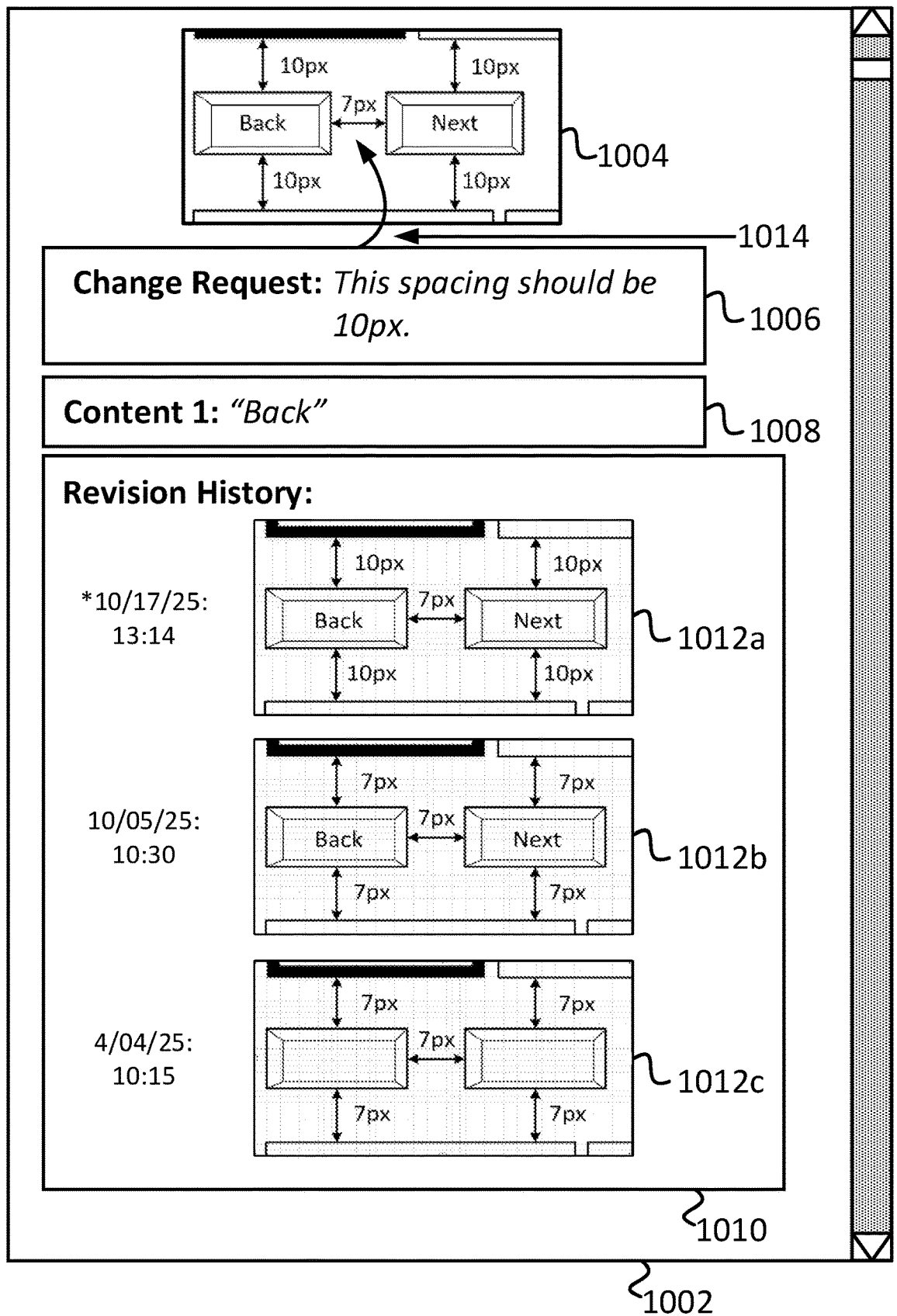
FIG. 10 illustrates a simplified focused specification that includes a first example of a revision history of a layout of the interactive design shown in FIG. 1, in accordance with some embodiments.

As previously described with reference to FIG. 5, in some embodiments, the focused specification generation module 506 communicates with a revision tracking database module 507 to retrieve revision information regarding one or more of the design elements selected by the selection box 806 by the user input 804. FIG. 10 illustrates an example focused specification 1002 in which a revision history data element 1010 of a selected representation data element 1004 is displayed, in accordance with some embodiments.

The focused specification 1002 generally includes the selected representation data element 1004 which includes selected design elements (i.e., the back button design element 110, and the next button design element 112) of the interactive design 102, as well as positioning data (e.g., the layout metadata 212) associated with the selected design elements, a selected change request data element 1006, a selected content data element 1008 that is associated with a first selected design element (e.g., the back button design element 110), the selected revision history data element 1010, and free-draw data 1014. The revision history data element 1010 generally includes revisions 1012a-c of the selected representation data element 1004. The revisions 1012a-c are identified by the focused specification generation module 506 using the revision tracking database module 507 and based on the interactive design 102 using source code revision tracking software processes that are known in the art.

If, for example, a different design element, or a different combination of design elements of the interactive design 102 was selected by the user input 804, the revision history data element 1010 would include revisions of those design elements. The revision history data element 1010 advantageously enables a recipient of the focused specification 1002 to quickly see how a selected representation data element 1004 has changed over time with without requiring the recipient of the focused specification to separately find a revision history of the selected representation data element in a separate revision tracking software application. For example, the revision 1012a displays the selected representation data element 1004 as of date Oct. 17, 2025 at time 13:14. The revision 1012b displays the selected representation data element 1004 as of date Oct. 5, 2025 at time 10:30, and the revision 1012c displays the selected representation data element 1004 as of date Apr. 4, 2025 at time 10:15.

Figure 11:
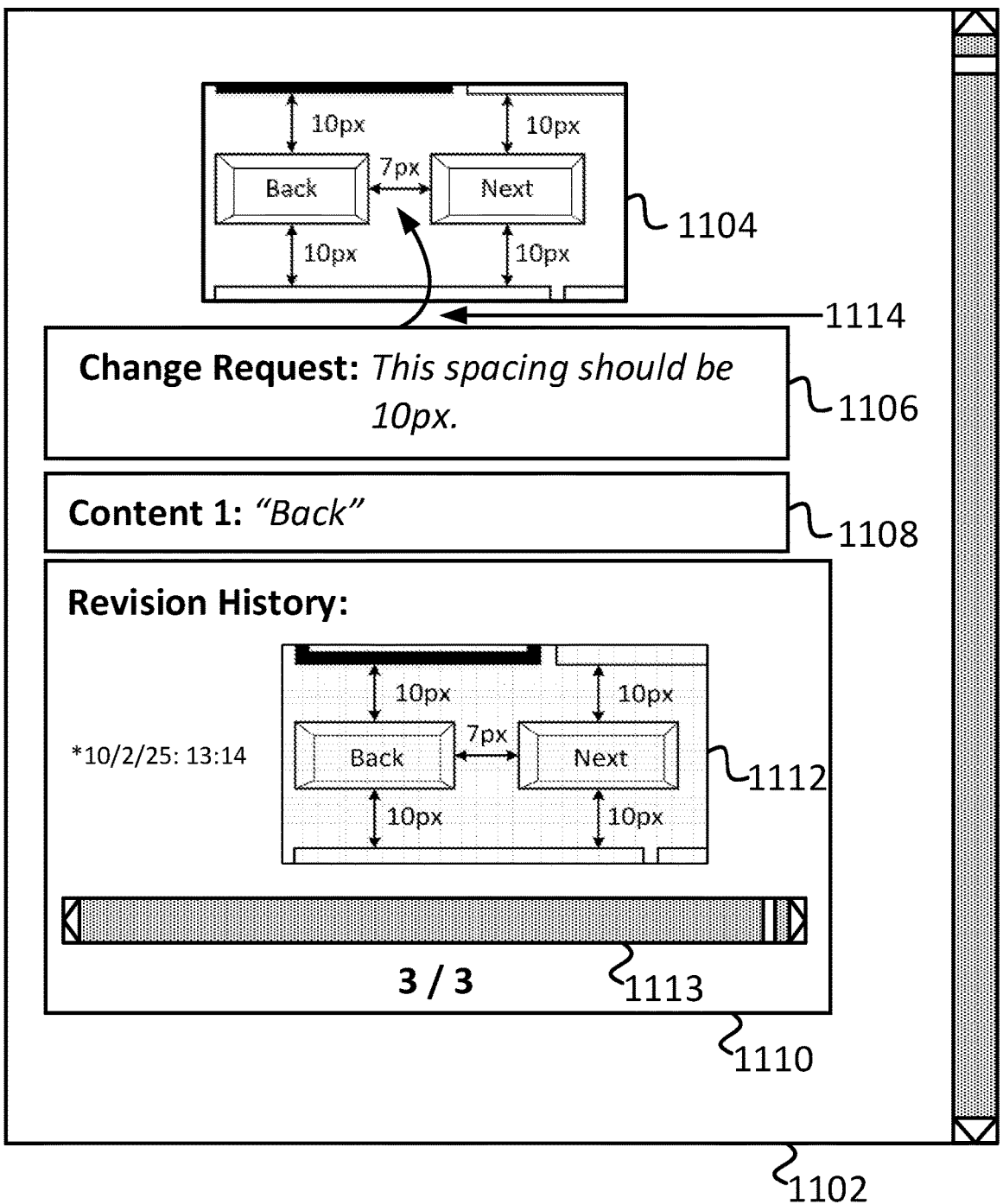
FIG. 11 illustrates a simplified focused specification that includes a second example of a revision history of a layout of the interactive design shown in FIG. 1, in accordance with some embodiments.

FIG. 11 illustrates another example of a revision history data element 1110 of a layout of the interactive design 102 in a focused specification 1102, in accordance with some embodiments. The focused specification 1102 generally includes a selected representation data element 1104, a selected change request data element 1106, a selected content data element 1108 of a first selected design element (e.g., the back button design element 110), the revision history data element 1110, and free-draw data 1114. The revision history data element 1110 generally includes a display 1112 of the selected representation data element 1104 for revisions selected by a scrollbar 1113. The scrollbar 1113 (or other similar graphical interface such as buttons, a slider, or a dial) advantageously allows a recipient of the focused specification 1102 to "scrub" through a revision history of the selected representation data element 1104, the scrollbar 1113 advancing revisions in time when moved in a first direction and receding revisions in time when moved in a second direction. In some embodiments, a generated format of the focused specification 1102 will not support such an interface, and instead the revision history data element 1110 is displayed as an expanded view similar to that shown in FIG. 10.

In some instances, a design element selected by a user (e.g., by the user input 504 or the user input 804) may include video, animation, or other multimedia content. In such instances, a focused specification can advantageously display all or a portion of the video, animation, or other multimedia content. For example, FIG. 12 illustrates a simplified focused specification 1202 that includes an embedded segment of interest 1204 of the multimedia design element 106 of the interactive design 102.

Figure 12:
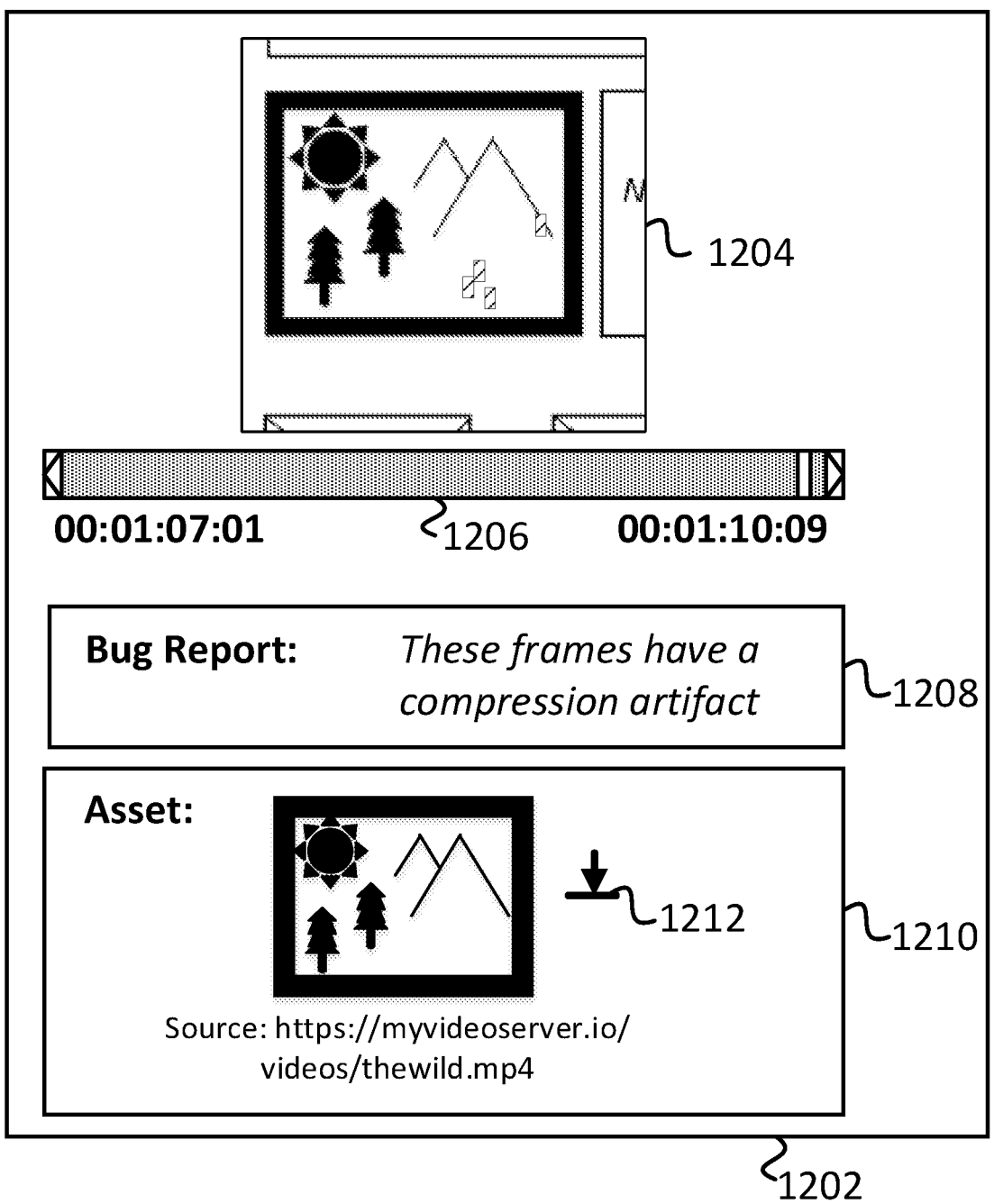
FIG. 12 illustrates a simplified focused specification that includes an embedded segment of interest of a video design element of the interactive design shown in FIG. 1, in accordance with some embodiments.

The focused specification 1202 of FIG. 12 generally includes the embedded segment of interest 1204, a playback control bar 1206, a selected defect specification data element 1208 ("bug report"), a selected asset data element 1210, and a download button 1212. In some embodiments, the playback control bar 1206 controls playback of only a segment (i.e., a range of frames) of the entire embedded segment of interest 1204, advantageously allowing a recipient of the focused specification 1202 to focus on a defect specification in the selected defect specification data element 1208. In some embodiments, the range of frames to be played back by the playback control bar 1206 is selected by an interface in a specification template. For example, a user could manually enter a numerical range of frames, could select a range of frames on a playback control bar that includes an entire range of frames, or could select a range of frames during playback of the multimedia design element 106. In some embodiments, a focused specification may not be generated in a format that is operable to display multimedia content. In such instances, the embedded segment of interest 1204 is transformed by the focused specification generation module 506 to a different format.

Figure 13:
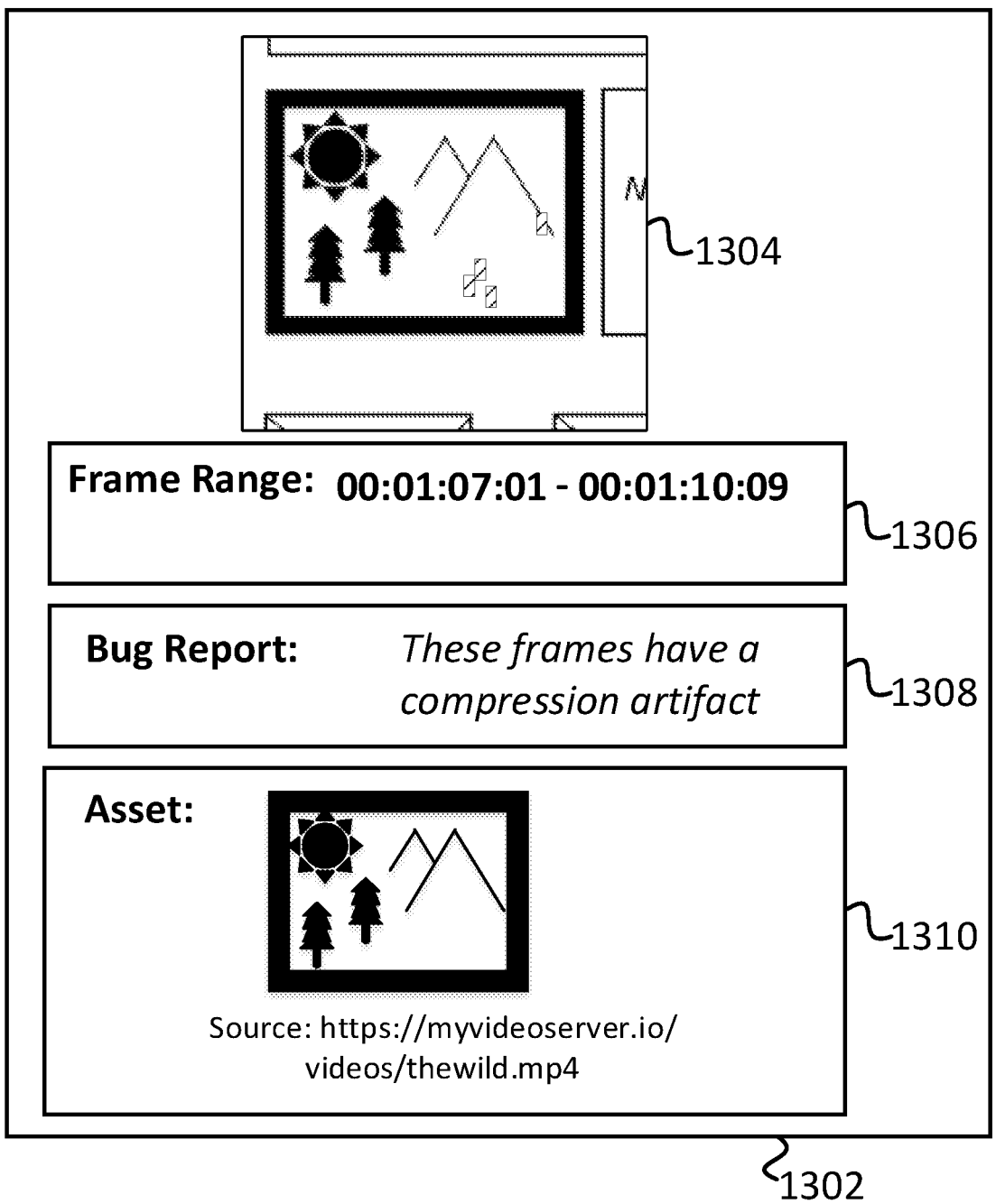
FIG. 13 illustrates a simplified focused specification that includes a still frame of interest of a video design element of the interactive design shown in FIG. 1, in accordance with some embodiments.

For example, FIG. 13 illustrates a simplified focused specification 1302 that includes an image of interest 1304 (e.g., a still frame from a video or animation) of the multimedia design element 106 of the interactive design 102 for a focused specification export format that does not support video playback, in accordance with some embodiments. The focused specification 1302 generally includes the image of interest 1304, a selected frame range data element 1306, a selected defect specification data element 1308 ("bug report"), and a selected asset data element 1310. In the example shown, the focused specification 1302 has been generated in a specification format that does not support video playback, scrollbars, or downloadable assets. Thus, rather than including an embedded video segment, such as the embedded segment of interest 1204, only an image of interest 1304 of the multimedia design element 106 is included in the focused specification 1302. In such embodiments, at the specification generation stage (i.e., step 410 of the process 400), the focused specification generation module 506 determines that a specification export type selected within the specification template (e.g., by the interface 626) does not support video playback and in response extracts a single frame of the multimedia design element 106 for display using video and image manipulation and editing software processes that are known in the art. In some embodiments, the image of interest 1304 is selected via user input received at the specification template 602. In some embodiments, the image of interest 1304 is selected, via the user input, during playback of the multimedia design element 106, by entering a frame number, or by other user input. Additionally, the focused specification template determines a selected range of frames (e.g., of the playback control bar 1206) and displays an indication of the selected range of frames as text using the selected frame range data element 1306. In some embodiments, such changes are displayed to a user within a specification template before a specification is generated using a focused specification preview display. In some embodiments, the focused specification preview is displayed to a user before a focused specification is generated.

Figure 14:
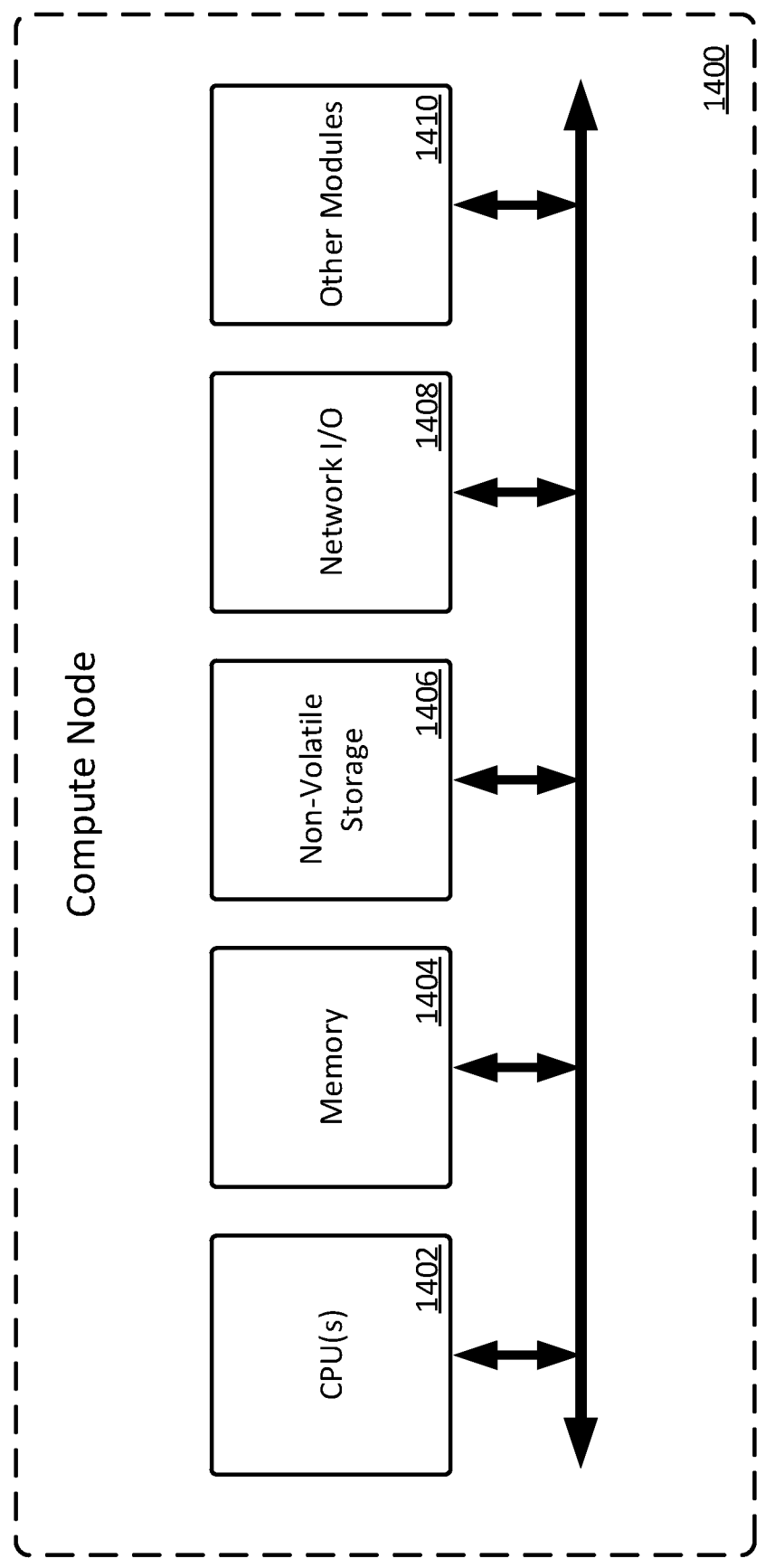
FIG. 14 illustrates a simplified compute node for implementing all or a portion of the process described with reference to FIG. 1 and FIGS. 4-13, in accordance with some embodiments.

FIG. 14 illustrates an example compute node 1400 for implementing all or a portion of the processes (e.g., the process 400) and one or both of the focused specification generation module 506 and the revision tracking database module 507 described with reference to FIG. 1 and FIGS. 4-13, in accordance with some embodiments. The compute node 1400 generally includes one or more central processing units (CPUs) 1402, a memory module 1404 (e.g., RAM), a non-volatile data storage module 1406 (e.g., a hard drive or array of hard drives), a network I/O module 1408 (e.g., a network interface card (NIC) and/or a top-of-rack interface), and other modules 1410 such as user I/O, wireless communication modules, optical communication modules, system diagnostic or monitoring modules, or other modules, one or more of the modules 1402-1410 being connected by one or more data busses. In some embodiments, the compute node 1400 is configured to perform all or a portion of the process steps discussed with reference to FIG. 1 and FIGS. 4-13. In some embodiments, one or both of the focused specification generation module 506 and the revision tracking database module 507 are instantiated (e.g., installed, stored, or executed at) the compute node 1400 or at a compute node that is similar to the compute node 1400. The non-volatile data storage module 1406, thus, stores data and several programs for some or all of the above-described functions and process steps, among others. The data and programs are loaded into the memory module 1404, so that the one or more CPUs 1402 (in conjunction with the memory module 1404) can perform some or all of the above-described functions and process steps, among others. In some embodiments, the CPUs 1402 are shared or dedicated CPUs. These CPUs could perform a single network function, perform multiple network functions, or perform other tasks in addition to performing network functions. Examples of the CPUs 1402 include microprocessors, digital signal processors, microcontrollers, and dedicated hardware such as ASICs (Application Specific Integrated Circuits) and FPGAs (Field Programmable Gate Arrays).

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A computer implemented method comprising:
receiving a first user input from a user, the first user input identifying a first design element from a pre-existing interactive graphical design;
identifying a set of selectable data elements corresponding to the first design element;
generating a specification template comprising the set of selectable data elements, the specification template providing a user interface for selecting which data elements of the set of selectable data elements will be included in a generated focused specification;
receiving a second user input from the user at the specification template, the second user input identifying a set of selected data elements using the specification template, the set of selected data elements comprising one or more of the selectable data elements; and
generating the focused specification using the set of selected data elements, the focused specification including the set of selected data elements and excluding selectable data elements that were not selected;
wherein:
the set of selectable data elements includes a representation of a second design element, the second design element being a design element directly adjacent to the first design element, the set of selectable data elements excluding a representation of a third design element that is not directly adjacent to the first design element.

2. The computer implemented method of claim 1, wherein:
the set of selectable data elements comprises one or more of a selectable representation of the first design element, a selectable metadata element, a selectable asset element, or a selectable content element.

3. The computer implemented method of claim 2, wherein:
the focused specification additionally includes one or more previous versions of the first design element, the one or more previous versions of the first design element being based on revision tracking data.

4. The computer implemented method of claim 1, wherein:
the focused specification displays a cropped view of the second design element.

5. The computer implemented method of claim 1, further comprising:
identifying positioning data corresponding to a positional relationship between the first design element and the second design element;
generating a visual representation of the positioning data; and adding the visual representation to the set of selectable data elements associated with the first design element.

6. The computer implemented method of claim 1, further comprising:
receiving, using the specification template, a third user input indicating free-draw data to be displayed over the focused specification; and
displaying the free-draw data over the focused specification.

7. The computer implemented method of claim 1, wherein:
the set of selectable data elements includes a first asset element, the first asset element being a link to a first graphical element of the first design element, the link corresponding to a storage location of the first graphical element.

8. The computer implemented method of claim 1, wherein:
the set of selectable data elements includes a first asset element, the first asset element being a first graphical element of the first design element.

9. The computer implemented method of claim 8, wherein:
the set of selectable data elements includes a second asset element, the second asset element being a second graphical element of the first design element, the first graphical element corresponding to a first state of the first design element, and the second graphical element corresponding to a second state of the first design element.

10. The computer implemented method of claim 1, wherein:
the set of selectable data elements includes a first content element, the first content element being text data of the first design element.

11. The computer implemented method of claim 1, wherein:
the set of selectable data elements includes a first metadata element, the first metadata element comprising first human-readable software instructions associated with the first design element.

12. The computer implemented method of claim 11, wherein:
the first human-readable software instructions include one or more of CASCADING STYLE SHEETS (CSS), HYPERTEXT MARKUP LANGUAGE (HTML), or JAVASCRIPT code.

13. The computer implemented method of claim 11, wherein:
the set of selectable data elements includes a second metadata element, the second metadata element comprising second human-readable software instructions associated with the first design element; and
the first human-readable software instructions are of a first software language and the second human-readable software instructions are of a second software language.

14. The computer implemented method of claim 11, wherein generating the focused specification comprises:
identifying a selected specification format;
identifying one or more compatible data element formats and one or more incompatible data element formats of the selected specification format;
identifying first selected data elements of the set of selected data elements that are of the one or more compatible data element formats;
adding the first selected data elements to the focused specification;
identifying second selected data elements of the set of selected data elements that are of the one or more incompatible data element formats;
transforming the second selected data elements to be of the one or more compatible data element formats; and
adding the transformed second data elements to the focused specification.

15. The computer implemented method of claim 14, wherein:
the one or more compatible data element formats include an image format; and
the one or more incompatible data element formats include a link to an image storage location.

16. The computer implemented method of claim 14, wherein:
the one or more compatible data element formats include an image format; and
the one or more incompatible data element formats include a software object that cannot be displayed by a software application used to view the focused specification.

17. The computer implemented method of claim 14, wherein:
the one or more compatible data element formats include an image format; and
the one or more incompatible data element formats include a text data format.

18. The computer implemented method of claim 14, wherein:
the second selected data elements comprise a plurality of images displayed over time; and
the transformed second selected data elements comprise a single image, the single image being an image of interest from the plurality of images.

19. The computer implemented method of claim 1, further comprising:
receiving a third user input from the user, the third user input comprising text data to be added to the focused specification.

20. The computer implemented method of claim 1, further comprising:
receiving a third user input from the user, the third user input comprising an indication of a specification priority to be added to the focused specification.

21. The computer implemented method of claim 1, further comprising:
receiving a third user input from the user, the third user input comprising an indication of a specification type to be added to the focused specification.

22. The computer implemented method of claim 1, wherein:
the focused specification is of a format compatible with a defect tracking software application.

23. The computer implemented method of claim 1, wherein:
the focused specification is of a format compatible with a web browser.

24. The computer implemented method of claim 1, wherein:
the focused specification is of a format compatible with an email authoring software application.

25. The computer implemented method of claim 1, wherein:
the focused specification is of a format compatible with a document authoring software application.

26. The computer implemented method of claim 1, wherein:

the focused specification is of a format compatible with a team communication software application.

27. The computer implemented method of claim 1, wherein:
the first design element corresponds to one or more respective data elements; and
the first design element is displayed in the interactive graphical design in accordance with the one or more respective data elements.

* * * * *